United States Patent
Yamakado et al.

(10) Patent No.: US 11,321,711 B2
(45) Date of Patent: May 3, 2022

(54) PROVIDING APPARATUS AND PROCESSING SYSTEM

(71) Applicant: SEIKO EPSON CORPORATION, Tokyo (JP)

(72) Inventors: Hitoshi Yamakado, Tokyo (JP); Tsuyoshi Kameda, Tokyo (JP); Hiroyuki Kuramoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 20 days.

(21) Appl. No.: 16/699,843

(22) Filed: Dec. 2, 2019

(65) Prior Publication Data

US 2020/0175508 A1 Jun. 4, 2020

(30) Foreign Application Priority Data

Dec. 4, 2018 (JP) .............................. JP2018-227125

(51) Int. Cl.
*G06Q 20/38* (2012.01)
*G06Q 30/04* (2012.01)

(52) U.S. Cl.
CPC ........... *G06Q 20/389* (2013.01); *G06Q 30/04* (2013.01)

(58) Field of Classification Search
CPC ... G06Q 20/389; G06Q 30/04; G06Q 30/0635
See application file for complete search history.

(56) References Cited

U.S. PATENT DOCUMENTS

| | | | | |
|---|---|---|---|---|
| 10,726,388 B2* | 7/2020 | Brodersen | ............... | G06F 16/27 |
| 10,839,015 B1* | 11/2020 | Leise | .................... | G07C 5/008 |
| 2017/0345080 A1* | 11/2017 | Asai | .................... | H04N 1/00413 |
| 2018/0232693 A1* | 8/2018 | Gillen | ................ | G06Q 10/0833 |
| 2019/0325522 A1* | 10/2019 | Bathia | ................ | G06K 9/00624 |
| 2020/0014720 A1* | 1/2020 | Giura | ....................... | G06F 8/65 |
| 2020/0151715 A1* | 5/2020 | Sato | ..................... | G06Q 20/389 |

FOREIGN PATENT DOCUMENTS

JP 2017-215691 A 12/2017

OTHER PUBLICATIONS

Ahmad et al., "Improving Identity Management of Cloud-Based IoT Applications Using Blockchain", Nov. 22, 2018, IEEE (Year: 2018).*
Ahmad et al., "Improving Identity Management of Cloud-Based IoT Applications Using Blockchain", Nov. 22, 2018, IEEE (Year: 2018) (Year: 2018).*

* cited by examiner

*Primary Examiner* — Florian M Zeender
*Assistant Examiner* — Vanessa Deligi
(74) *Attorney, Agent, or Firm* — Global IP Counselors, LLP

(57) ABSTRACT

A providing apparatus includes a communication unit performs communication with a network that uses a blockchain, and a processing unit that controls the communication unit. The processing unit generates a transaction for registering with the blockchain a service providing processing program for performing service providing processing on electronic equipment that is a management target, and issues the generated transaction to the network through the communication unit. The service providing processing program performs processing that makes a request to a service provider, which is indicated by information on the service provider stored in the blockchain, for a service.

1 Claim, 17 Drawing Sheets

PROVIDING APPARATUS AND PROCESSING SYSTEM

The present application is based on, and claims priority from JP Application Serial Number 2018-227125, filed Dec. 4, 2018, the disclosure of which is hereby incorporated by reference herein in its entirety.

BACKGROUND

1. Technical Field

The present disclosure relates to a providing apparatus, a processing system, and the like.

2. Related Art

In the related art, a system is known that provides a service relating to electronic equipment such as a printer. For example, a system for automatically delivering a consumable item for the electronic equipment. In JA-A-2017-215691, a system is disclosed in which, when a consumable item for a device satisfies a condition for replacement, an information processing terminal places an order with a server for the consumable item and makes a request for shipping of the consumable item.

A configuration of the system that provides the service relating to the electronic equipment is considered in various ways. For example, a technique is considered in which multiple systems, such as a system that collects and totals pieces of data from the electronic equipment, a system that performs a specific service based on a result of the totaling, a system that charges a billing amount, and a system that makes a payment, are caused to cooperate with each other.

However, in the related art, a technique is not disclosed in which a blockchain is used in the system that provides the service relating to the electronic equipment.

SUMMARY

According to an aspect of the present disclosure, there is provided a providing apparatus including: a communication unit that performs communication with a network that uses a blockchain; and a processing unit that controls the communication unit, in which the processing unit generates a transaction for registering with the blockchain a service providing processing program for performing service providing processing on electronic equipment that is a management target and issues the generated transaction to the network through the communication unit, and in which the service providing processing program performs processing that makes a request to a service provider, which is indicated by information on the service provider stored in the blockchain, for a service.

DESCRIPTION OF EXEMPLARY EMBODIMENTS

The present embodiment will be described below. It is noted that the present embodiment which will be described below do not improperly limit the subject matters of the disclosure, which are claimed in claims. Furthermore, all configurations that will be described according to the present embodiment are not necessarily indispensable configurational requirements.

1. Outline

Figure 1:
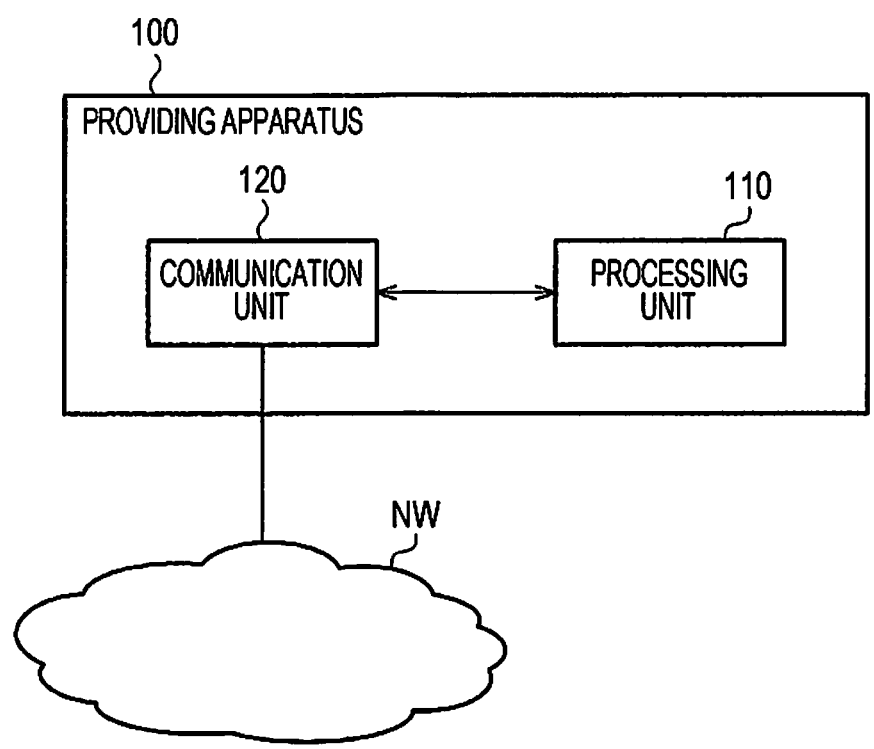
FIG. 1 is a diagram illustrating an example of a configuration of a providing apparatus.

FIG. 1 is an example of a configuration of a providing apparatus 100 according to the present embodiment. The providing apparatus 100 includes a communication unit 120 that performs communication with a network which uses a blockchain, and a processing unit 110 that controls the communication unit 120. Then, the processing unit 110 generates a transaction for registering with a blockchain a service providing processing program for performing service providing processing on electronic equipment which is a management target, and issues the generated transaction to a network through the communication unit 120. Detail of this will be described below with reference to FIG. 2, but electronic equipment 300 is connected to the network that uses the blockchain, directly or through a processing apparatus 200. Furthermore, the service providing processing will also be described in detail below. The network that uses the blockchain is hereinafter expressed as a blockchain network NW. It is noted that the "registration with the blockchain" is specifically writing of data to a block in the blockchain.

In the blockchain network NW, a data structure is used that is referred to as a blockchain which results from linking multiple blocks in the form of a chain. The transaction is a command that is issued when performing processing that registers data with the blockchain. Each node on the blockchain network NW retains a blockchain with the same content. For this reason, when the transaction including a processing program issued by the providing apparatus 100 is written into the blockchain, it is possible that all nodes participating in the blockchain network NW make reference to the processing program. The processing program here is a service providing processing program in a narrow sense, such as an ordering processing program, but the processing programs may include various programs associated with the service providing processing as will be described below. Accordingly, each processing program for realizing the service providing processing is provided easily.

The electronic equipment 300 according to the present embodiment, for example, is a printer.

Alternatively, the electronic equipment 300 may be a scanner, a facsimile machine, or a copy machine. The electronic equipment 300 may be a multifunction peripheral (MFP) that has multiple functions, and a multifunction peripheral that has a printing function is also an example of the printer. The electronic equipment 300 may be a projector, a head-mounted display, wearable equipment, biological information measuring equipment, such as a pulse meter or a physical activity meter, a robot, video equipment, such as a camera, a portable information terminal, such as a smartphone, physical quantity measuring equipment, or the like.

It is noted that the processing unit 110 according to the present embodiment is configured with hardware components that will be described below. The hardware components can include at least one of a circuit that processes a digital signal and a circuit that processes an analog signal. For example, the hardware component is configured with one or multiple circuit devices that are mounted on a circuit substrate, or with one or multiple circuit elements. One or multiple circuits, for example, are ICs or the like. One or multiple circuit elements, for example, are resistors, capacitors or the like.

Furthermore, the processing unit 110 may be realized by a processor that will be described below. The providing apparatus 100 according to the present embodiment includes a memory in which information is stored, and a processor that operates based on the information stored in the memory. Examples of the information include a program, various pieces of data, and the like. The processor includes hardware components. The processors which are usable include various processors, such as a central processing unit (CPU), a graphics processing unit (GPU), and a digital signal processing (DSP). The memory may be a semiconductor memory, such as a static random access memory (SRAM) or a dynamic random access memory (DRAM), may be a register, may be a magnetic storage device, such as a hard disk device, and may be an optical storage device, such as an optical disk device. For example, a computer-readable command is stored in the memory, and the command is executed by the processor. Thus, a function of each of the units of the providing apparatus 100 is realized as processing. The command here may be a command in a command set that makes up the program and may be a command that instructs a hardware circuit of the processor to perform an operation.

Figure 2:
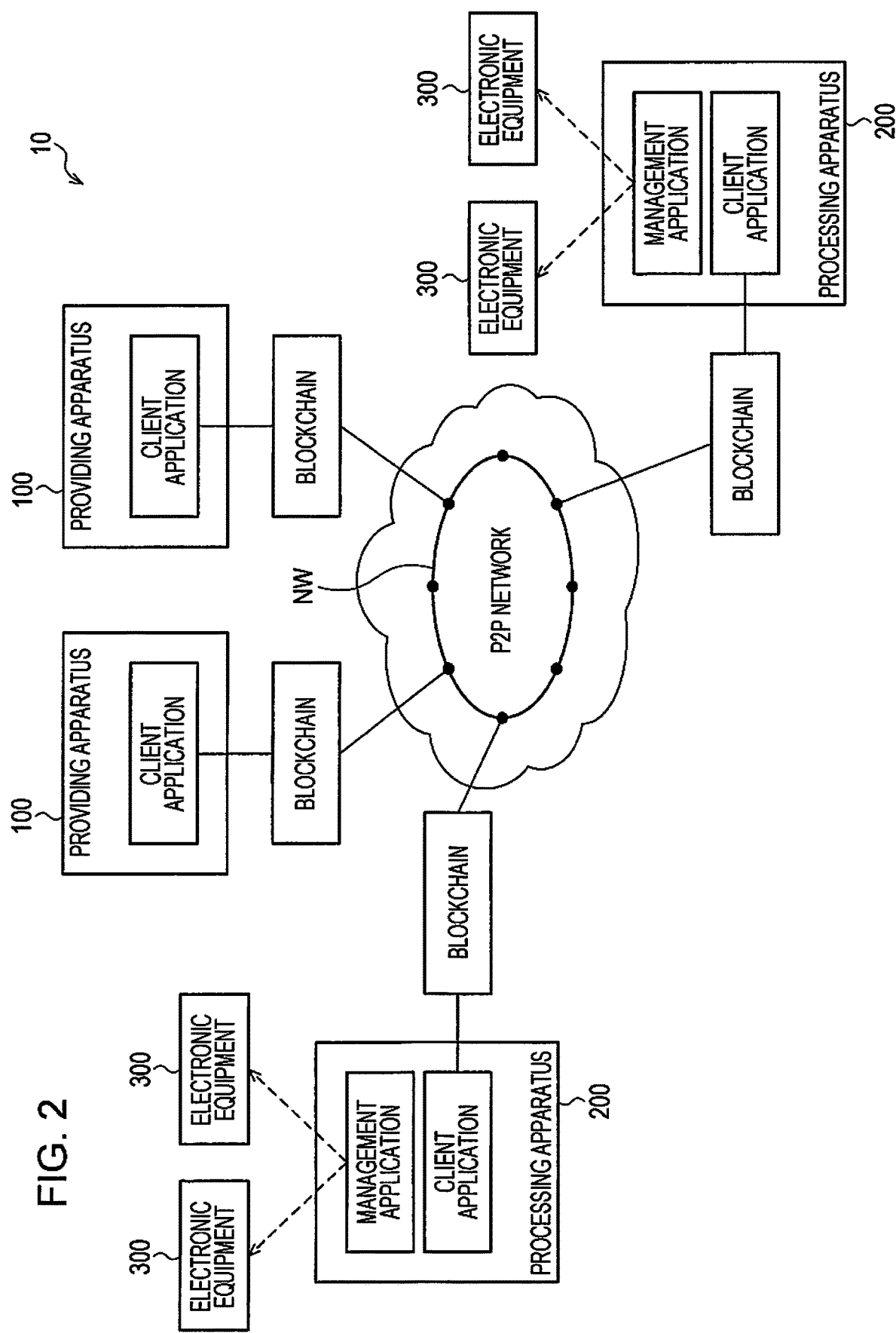
FIG. 2 is a diagram illustrating an example of a configuration of a processing system.

FIG. 2 is an example of a configuration of a processing system 10 that includes the providing apparatus 100 according to the present embodiment and the processing apparatus 200. The processing apparatus 200 is an apparatus that is provided in a manner that corresponds to the electronic equipment 300. The providing apparatus 100 is apparatus that performs processing which writes the processing program into the blockchain under a smart contract. In FIG. 2, an example is illustrated where two providing apparatuses 100 are present. For example, one providing apparatus 100 is an apparatus that is used by a platform manager who will be described below, and the other is an apparatus that is used by a service provider. However, the number of the providing apparatuses 100 is not limited to 2. Furthermore, in FIG. 2, an example is illustrated where two processing apparatuses 200 are present and where two pieces of electronic equipment 300 are connected to each processing apparatus 200, but the number of the processing apparatuses 200 and the number of the pieces of electronic equipment 300 are not limited to 2 and 4, respectively. The processing apparatus 200 is specifically an apparatus that is used by a service user who will be described.

Furthermore, in FIG. 2, an example is illustrated where the processing apparatus 200 and the electronic equipment 300 are of different types of machines, and the electronic equipment 300 may include the processing apparatus 200. That is, the electronic equipment 300 is not prevented from participating directly in the blockchain network NW.

A client application for the blockchain is installed on the providing apparatus 100 and the processing apparatus 200. The client application is software for participating in the blockchain network NW. The client application, for example, is software for performing various processing operations that are performed in the blockchain network NW, such as transaction generation and issuing, consensus algorithm processing, and virtual currency management.

Furthermore, a management application for managing the processing apparatus 200 is installed on the electronic equipment 300. It is noted that the client application and the management application may be different applications that run in cooperation with each other, and may be realized as one application that includes both a client function of the blockchain and a management function of the electronic equipment 300.

The management application performs control of the electronic equipment 300 by performing a processing command to the electronic equipment 300. The processing command that performs the control of the electronic equipment 300 is considered to include various commands such as an initialization command, a restart command, and a setting change command. Furthermore, it is assumed that the processing program that acquires information on the electronic equipment 300 is written into the blockchain and is performed by the client application. Examples of the processing program that acquires the information on the electronic equipment 300 include a remaining quantity collection program, a warning state verification program, and the like. However, the management application may retain a program that is equivalent to the processing program. In this instance, the management application periodically executes the program, and thus acquisition of the information on the electronic equipment 300 is performed.

It is noted that, without being limited to the providing apparatus 100 that is illustrated in FIG. 1, a technique according to the present embodiment may be applied to the processing system 10 that is illustrated in FIG. 2. As illustrated in FIG. 2, the processing system 10 according to the present embodiment includes the providing apparatus 100 and the processing apparatus 200 that is provided in a manner that corresponds to the electronic equipment 300. The processing apparatus 200, for example, performs processing programs, such as the remaining quantity collection program and the warning state verification program that will be described below, which performs acquisition of data on a status of, or data on a state of, use of the electronic equipment 300.

2. Blockchain and Smart Contract

Next, a blockchain technology will be described. It is noted that one or several elements that make up the blockchain technology will be described in detail below and that a different technological element may be added. Furthermore, one or several technological elements that will be described below may be omitted. Furthermore, a method that results from developing each technological element is included in the blockchain technology according to the present embodiment.

The blockchain is a technique in which a distribution-type consensus is built among participants in an open network. The blockchain network NW is a P2P network. For this reason, in the blockchain network NW, which is different from a client-to-server type system, specific equipment does not perform uniform management. In the blockchain network NW, data is managed with the data structure that is referred to as a blockchain that results from linking blocks, and each node retains a common blockchain.

Figure 3:
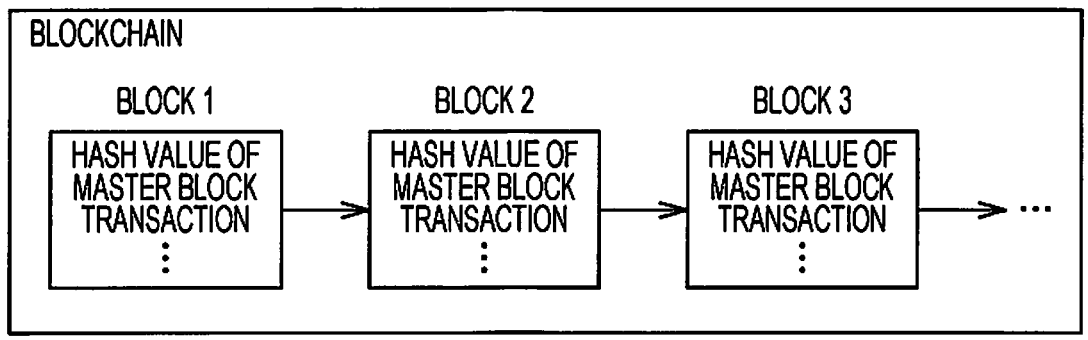
FIG. 3 is a diagram for describing a blockchain.

FIG. 3 is a diagram for describing a structure of the blockchain. One block includes data on multiple transactions and data that is a hash value of a master block. The hash value of the master block is specifically a hash value of a block header of an immediately-preceding block header. With the hash value, a connection between blocks is realized. The transaction is a command that is issued by a node when registering data with a blockchain. For example, when a trade is made that uses a virtual currency, a transaction is generated that includes pieces of information, such as a user address of a remittance source, a user address of a remittance destination, and an amount of remittance.

The generated transaction is broadcast with a transmitter's signature on the generated transaction, and propagates to each node on the blockchain network NW. It is noted that it is possible that transmission of the transaction is realized by various data propagation algorithms that are used in the P2P network. For example, a technique may be applied in which the transaction is transmitted simply to a neighboring node and in which propagation from the neighboring node to another node is repeated. Alternatively, a specific node having a high probability of existing, which is referred to as a super node, may be stipulated, and the transaction may be transmitted to the super node. The setting of the super node to be a transmission destination makes it possible to increase a probability that the transaction will propagate to each node on the blockchain network NW is increased.

The addition of a block to a blockchain is realized by a node that is referred to as a minor node. When a prescribed amount of transaction is accumulated, the minor node attempts to generate a block including the transaction. The block is added to the blockchain under a condition in which a consensus is built according to a consensus algorithm.

When proof of work (Pow) is used as the consensus algorithm, the hash value of the block header needs to satisfy a specific condition. The specific condition, for example, is a condition that the hash value is smaller than a prescribed threshold. The block header includes a field that is referred to as a nonce, and the nonce is set by the minor node. In other words, the minor node performs processing that searches for a nonce that is such that the hash value of the block header satisfies a specific condition. With a hash function for obtaining the hash value, an output value is difficult to predict from an input value. Because of this, the minor node needs to search a nonce that satisfies a condition, in a round robin while changing a nonce. That is, the PoW is a technique in which a consensus is built based on an amount of work.

When a new block is generated by the minor node, the block goes through verification in each node and propagates within the blockchain network NW. The verification in each node is processing that determines whether or not the hash value satisfies the specific condition and is possibly performed in a short time.

It is noted that the consensus algorithm is not limited to the PoW. For example, consensus algorithms may be used such as a proof of state (PoS) in which a voice is given according to an amount of retained virtual currency and a proof of importance (PoI) in which a voice is given according to a degree of importance of a participant. Furthermore, when a peculiar signature is given, a consensus may be regarded as being established unconditionally. Furthermore, when a private network is used that can be accessed by only a limited user or terminal, a determination that uses a signature may not be made and a consensus may be regarded as being built unconditionally. The building of a consensus that is based on the consensus algorithm according to the present embodiment is regarded as including unconditional building of a consensus.

Figure 4:
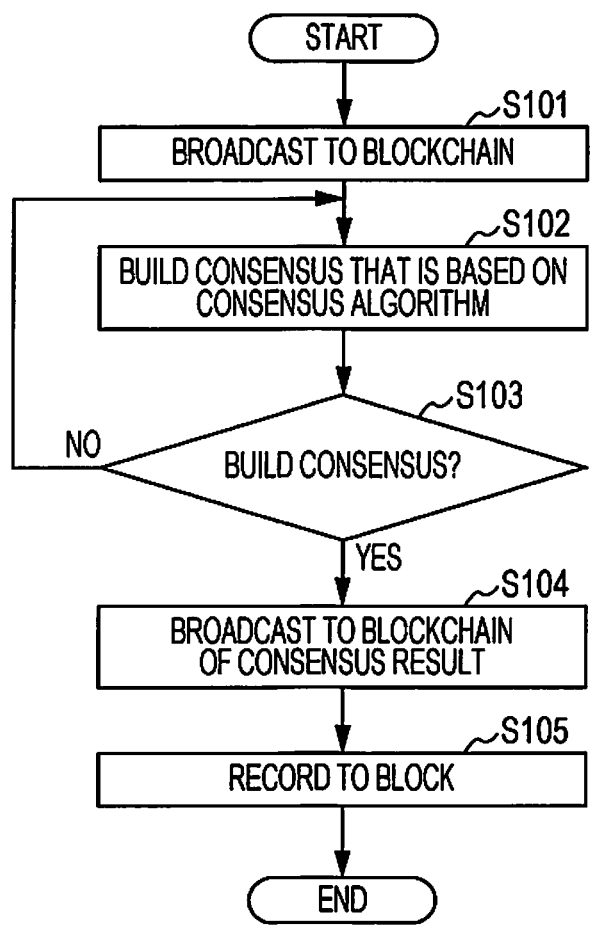
FIG. 4 is a flowchart for describing processing for writing into the blockchain.

FIG. 4 is a flowchart for describing processing that writes data into a blockchain. When this processing starts, first, a node that desires writing of data to the blockchain generates a transaction including the data, and broadcast the transaction to the blockchain network NW (S101). Notification to each node is not limited to the broadcasting, and as described above, a different means that is used in the P2P network may be used.

Next, in order to determine whether or not the data may be written into the blockchain, each node builds a consensus that is based on the consensus algorithm (S102). The consensus algorithms that are employable include various consensus algorithms described above, such as the PoW, the PoS, and the PoI. The processing in S102 is repeated until the consensus is gained with the consensus algorithm (No in S103).

When the consensus is gained with the consensus algorithm (Yes in S103), the node that gains the consensus broadcasts the building of the consensus to a different node (S104), and the different node writes data into a blockchain that is retained by the different node itself (S105). With the processing described above, the data that is broadcast in S101 is added to the blockchain, and is available to each node.

Furthermore, it is possible that in the blockchain network NW, a program that is executed on a node is added to the blockchain. The program includes a state and a function and is executed depending on an environment of execution with a node. The state may be replaced with a set of variables and the function may be replaced with a subroutine, a method, or the like. The environment of execution within a node, for example, a virtual machine. In this manner, a mechanism in which a program is added to a blockchain and thus the program is executed on a node is referred to as a smart contract.

The writing of data to a program by the smart contract is also performed according to the flow described with reference to FIG. 4. That is, a node that desires writing of data into the smart contract generates a transaction including a program that is a target to write and broadcasts the generated transaction. When a consensus on the transaction is established by the consensus algorithm, the program is written into the blockchain by the smart contract.

The processing unit 110 of the providing apparatus 100 according to the present embodiment generates the transaction for registering the service providing processing program with the blockchain using the smart contract. In this manner, by writing a service providing processing program into a blockchain using the smart contract, it is possible that the service providing processing program is executed in an arbitrary node on the blockchain network NW.

Particularly, in the blockchain technology, it is possible that from a program of a given smart contract, a program of a different smart contract is invoked. That is, by executing the service providing processing program or the like written into the blockchain using the smart contract, it is possible that cooperation between processing programs is easily realized. Specific cooperation will be described below.

3. Platform Manager, Service Provider, and Service User

In the technique according to the present embodiment, various services are provided using a service providing platform that utilizes the blockchain network NW. The platform manager, the service provider, and the service user are assumed to be participants in the service-providing platform.

The platform manager is a business operator that provides and manages the service providing platform. The service provider is a business operator that provides a service utilizing the service providing platform. The service user is a user that uses a service that is provided in the service-providing platform. The service user may be an individual or an organization such as a company. It is noted that because the service here is a service relating to the electronic equipment 300, the service user is a user that uses the electronic equipment 300.

The platform manager stores information on the service provider and service-contents information that is provided by the service provider, in an associated manner, and thus manages the service provider. Examples of the information on the service provider include pieces of information, such as a name, an address, a person in charge, and a date and time of registration of the service provider. A digital ID that will be described below may be included in the information on the service provider. Examples of the service-contents information include pieces of information that possibly specifies a detail of a service, such as consumable-item delivery and repair contracting that will be described below. The information on the service provider and the service-contents information are hereinafter collectively expressed as information indispensable for service registration.

The platform manager makes an agreement with the service provider, and, based on contents of the agreement, performs processing that registers the information indispensable for service registration. It is noted that the platform manager may also serve as the service provider. In this instance, processing that registers a service which is provided by the platform manager may be omitted. Alternatively, an agreement is regarded as being made, and thus the processing that registers the information indispensable for service registration may be performed. For example, the platform manager may lend the electronic equipment 300 to the service user and may provide a service that performs billing processing in accordance with the status of the use of the electronic equipment 300. Examples of the status of the use of electronic equipment 300 here include a quantity of ink or toner used, the number of printing sheets, the number of scanned sheets, and a time of usage of equipment.

Figure 5:
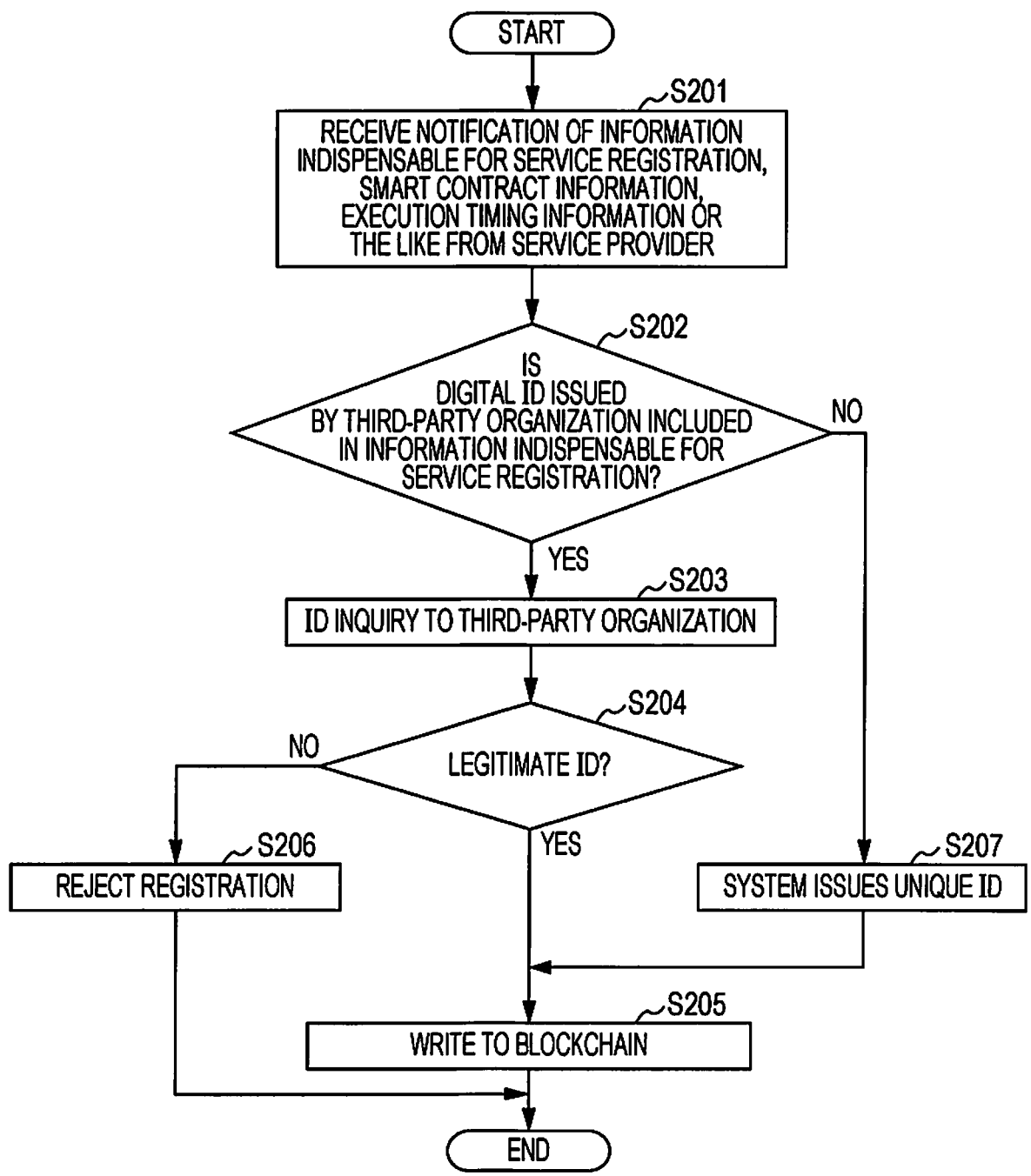
FIG. 5 is a flowchart for describing processing that registers a service provider.

FIG. 5 is a flowchart for describing specific registration processing. First, a management system that is used by the platform manager acquires information indispensable for service registration (S201). It is noted that, for providing a service, various processing programs need to be executed at a proper timing. Consequently, in S201, the management system may acquire smart contract information for specifying a processing program to use, and execution timing information on the processing program.

Next, the management system determines whether or not a digital ID issued by a third-party organization is included in the information indispensable for service registration (S202). The digital ID is identification information that is managed on a computer. The third-party organization is an organization that is different from any one of the platform manager and the service provider, and is an organization that issues and authenticates a digital ID. The digital ID that is issued by the third-party organization may be a digital ID that utilizes a blockchain and may be a digital ID that does not utilize a blockchain. Furthermore, the digital ID here may be a certificate that is issued by a certificate-issuing organization.

When the digital ID is included in the information indispensable for service (Yes in S202), the management system inquires of the third-party organization concerning an ID (S203) and determines whether or not the digital ID is a legitimate ID (S204). When the digital ID is a legitimate ID (Yes in S204), the management system performs processing that writes information that includes the information indispensable for service registration, which is acquired in S201, into the blockchain (S205). Specifically, the client application that is included in the providing apparatus 100 of the platform manager invokes an agreement management contract that will be described below, and thus the processing in S205 is performed. Processing for writing the information indispensable for service registration into the blockchain is described in the agreement management contract. It is possible that the agreement management contract properly manages an agreement with the service provider by referring to information on which the agreement management contract itself performs writing processing, among various pieces of information that are written into the blockchain. On the other hand, when the digital ID is not legitimate (No in S204), the management system rejects registration (S206). Specifically, the management system ends the processing without writing the information indispensable for service registration, or the like.

Furthermore, when the digital ID is not included in the information indispensable for service registration (No in S202), the management system issues a unique ID to the service provider that is a processing target (S207). The management system performs the processing that writes the information that includes the information indispensable for service registration, which is acquired in S201, into the blockchain (S205).

By performing processing that is illustrated in FIG. 5, it is possible that the service provider of which the digital ID issued by the third-party organization is not legitimate is excluded, that an agreement with the service provider is managed using the blockchain, and that the service provider of which the registration is completed and the digital ID are associated with each other. It is noted that, when utilizing a service, the digital ID may be used to verify whether or not a service that is a target to utilize is registered completely as a legitimate service. This verification, for example, is performed by the agreement management contract. This will be described in detail below. Furthermore, when an embodiment is employed in which it is not verified whether a service that is a target to use is completely registered as a legitimate service, processing relating to the digital ID may be omitted. For example, the processing in each of S202 to S204, S206, and S207 in FIG. 5 is omitted.

It is noted that in the processing in S205, if it is considered that the information indispensable for service registration is written into the blockchain by invoking the agreement management contract, it is desirable that the management system here is realized by the providing apparatus 100 that is used by the platform manager. However, the management system may be realized by an apparatus that is different from the providing apparatus 100 and may be realized by apparatus 100 and a different apparatus cooperating with each other.

The processing that is illustrated in FIG. 5, for example, is suitable when an agreement is made except for the service providing platform. In that instance, the platform manager has an opportunity to determine reliability of the service provider in stages including and up to a stage where an agreement is made, or in stages including and up to a stage where the registration processing that is illustrated in FIG. 5 is started. Because whether or not the registration processing is performed is controlled on the platform manager side, when the digital ID that is issued by the third-party organization is not retained, although the service provider is registered, this does not cause a problem. Specifically, even when No is a result of the determination in S202, it is possible that the processing in S205 is performed.

However, the registration of the service provider cannot also be prevented from being automated using the smart contract. For example, the agreement management contract includes a function that performs processing which acquires and registers the information indispensable for service registration, and provides the function as an application programming interface (API). The service provider inputs the information indispensable for service registration using the API and thus attempts to register the service provider itself.

Figure 6:
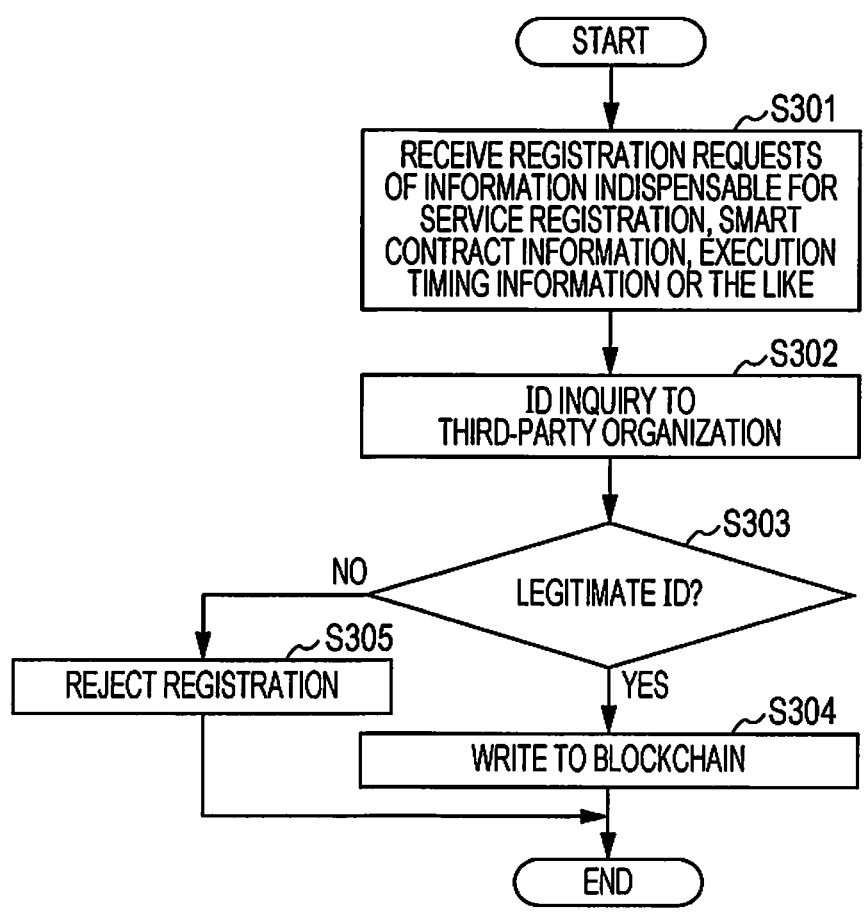
FIG. 6 is a flowchart for describing the processing that registers the service provider.

FIG. 6 is a flowchart for describing the registration processing in this instance and is a flowchart for processing that is performed by the agreement management contract. When this processing is started, the providing apparatus 100 that makes the agreement management contract receives a registration request from the service provider (S301). Specifically, the information indispensable for service registration, the smart contract information, the execution timing information, and the like are received as inputs.

In this instance, because the registration request is made from the service provider side, service providers cannot be screened on the platform manager side before the registration processing. In other words, there is a concern that a service provider that is unreliable will get into the service providing platform. Therefore, the inclusion of the digital ID issued by the third-party organization in the information indispensable for service registration is set here to be a condition required for registration. That is, the agreement management contract sets the inputting of the digital ID issued by the third-party organization in S301 to be a condition for proceeding to processing in each of S302 and subsequent steps.

Then, the providing apparatus 100 inquires of the third-party organization concerning an ID (S302) and determined whether or not the digital ID is a legitimate ID (S303). When the digital ID is a legitimate ID (Yes in S303), the providing apparatus 100 performs the processing that writes the information that includes the information indispensable for service registration, into the blockchain (S304). When the digital ID is not a legitimate ID (No in S303), the providing apparatus 100 rejects registration (S305).

By performing processing that is illustrated in FIG. 6, processing that makes an agreement between the platform manager and the service provider, and processing that registers the service provider can be automated. For this reason, it is possible that load on both the platform manager and the service provider is reduced. On that occasion, by using the digital ID that is issued by the third-party organization, it is possible that an improper service provider is suppressed from being registered.

In this manner, the processing unit 110 of the providing apparatus 100 that is used by the platform manager generates a first transaction for registering with the blockchain a management program for managing the service provider that provides the service relating to the electronic equipment 300, and issues the generated first transaction to a network through the communication unit 120. Furthermore, the management program generates a second transaction for registering, with the blockchain, information that results from associating the information on the service provider, which identifies the service provider with the service providing processing program for providing a service by the service provider, and issues the generated second transaction to a network through the communication unit 120.

When this is done, it is possible that the platform manager provides a management program using the blockchain network NW, and that the management program writes necessary information into the blockchain. That is, it is possible that various service providers participate in the service providing platform that uses the blockchain. Furthermore, it is also possible that the service provider is managed properly on the blockchain.

The information on the service provider here may be information that possibly specifies the service provider and does not need to include all pieces of information described above. Furthermore, the information on the service provider may be a digital ID. The digital ID may be an ID that is issued by the third-party organization and may be an ID that is issued by the management system. Furthermore, the management program, for example, is the agreement management contract described above. However, the agreement management contract, which will be described in detail below, is a program that manages an agreement between the service provider and the service user. The agreement management contract may manage the service provider, and the management program that manages the service provider may be realized as a program that is separate from the agreement management contract. It is noted that the management program may perform processing (S205 or S304) for writing to the blockchain and may inquire of the digital ID, and so on, and may not inquire of the digital ID.

With the processing described above, the processing that registers the service provider in the service providing platform is performed. The service user searches for the service that is finished completely, using the service-providing platform. Specifically, the platform manager provides a means of finding a service necessary for the service user, using the information indispensable for service registration.

For example, the platform manager provides a retrieval system as a mean for providing a service. In the retrieval system, the service user inputs pieces of arbitrary information associated with a service that the service user itself desires to utilize, such as a name of the service provider, service contents, an area where a service is provided, and the like. The information that is input at this point, for example, is text information. The retrieval system provides a service associated with the information that is input.

Alternatively, the platform manager provides a filtering system as a means of finding a service. The service user inputs a filtering condition in the filtering system. The filtering system performs filtering processing that meets a condition which is input for a service that is registered completely, and performs a result of the processing to the service user. The filtering conditions that are possibly set include a genre of a service, information on each service, the order of evaluation, and the number of times that an order for each service is received. Furthermore, it is also possible that it is estimated that the service provider that contributes much to the blockchain can be reliable. Consequently, the filtering system may perform filtering that is based on an amount of mining in the blockchain.

Alternatively, the platform manager may provide a directory service as a means of finding a service. More specifically, the platform manager may provide a portal for selecting a service that is registered completely. The directory service manages a service that is registered completely, using a specific data structure such as a tree structure. It is possible that the service user reaches a service that is intended, by setting the portal to be a starting point. The directory service is known and thus a detailed description thereof is omitted.

The service user selects a service that is desired to be used, using various means described above. Then, the service user inputs information necessary for utilizing the service, and thus makes an agreement relating to the service with the service provider. The contents of the agreement are written into the blockchain. The contents of the agreement are managed by the agreement management contract. Specific contents of the agreement vary from one service to another, and thus will be described in detail below. It is noted that a consumable-item delivery service and a repair contracting service will be described in detail below, but that the registration of the service provider and the search for a service by the service user are described as completed according to the flow described above.

4. Specific Examples of Service

The processing unit 110 of the providing apparatus 100 according to the present embodiment generates the transaction for registering with the blockchain the service providing processing program for performing the service providing processing on the electronic equipment 300 that is a management target, and issues the generated transaction to the blockchain network NW through the communication unit 120. The service providing processing program performs processing that makes a request to the service provider, which is indicated by the information on the service provider stored in the blockchain, for a service. When this is done, it is possible that a proper service is requested to provide a service. For example, as described above, processing for writing into the blockchain is performed by the agreement management contract on the information on the service provider.

The consumable-item delivery service and the repair contracting service will be described below as specific examples of the service. The service providing processing program in the consumable-item delivery service corresponds to a remaining-quantity-of-consumable-item collection program, the remaining quantity computation program, a warning state verification program, and an ordering program. The service providing processing program in the repair contracting service corresponds to a state verification program and a repair arrangement program.

Furthermore, the service providing processing program performs processing that writes service-providing data, which includes an expense that occurs by providing a service, into the blockchain. Furthermore, based on the service-providing data written into the blockchain, the processing unit 110 of the providing apparatus 100 generates a transaction for registering with the blockchain a billing processing program that determines a billing amount. When this is done, the billing processing that accompanies the providing of the service is possible. The expense that occurs in the consumable-item delivery service includes a cost of a consumable item itself, a shipping fee, and the like. The expense that occurs in the repair contracting service includes a business trip expense, a technical fee, a cost of a part, and the like.

4.1 Consumable-Item Delivery Service

A consumable-item delivery service is described. A specific example of the smart contract that is used in the consumable-item delivery service is first described and then a flow for processing is described with reference to a flowchart.

4.1.1 Smart Contract

Agreement Management Contract

The processing unit 110 of the providing apparatus 100 generates information on the contents of the agreement that determines a detail of the service providing processing, and a transaction for registering with the blockchain an agreement management program that manages the information on the service provider. The agreement management program that is written into the blockchain using the smart contract is expressed as the agreement management contract.

When this is done, using the agreement management contract that is a program which runs on the blockchain, it is possible that the service provider and a detail of a service that is provided by the service provider are managed. In other words, the agreement management contract manages the agreement between the platform manager and the service provider and an agreement between the service provider and the service user.

The agreement between the platform manager and the service provider, as described above, is managed based on the processing that registers the information indispensable for service registration. For example, the agreement management contract has a function of writing the information indispensable for service registration to the blockchain, and determines a legitimate service that is registered completely, which is based on the information indispensable for service registration that is written by the agreement management contract itself. In other words, although the information indispensable for service registration is written into the blockchain without involving the agreement management contract, a service that corresponds to the information indispensable for service registration is not determined as the legitimate service. When this is done, the providing of a service by an improper service provider can be suppressed.

Furthermore, the agreement management contract manages an agreement account information for determining a detail of processing that places an order for a consumable item. The agreement account information includes information that specifies the service user, and information that indicates the contents of the agreement. When this is done, it is possible that the ordering processing that is based on the contents of the agreement between the service provider and the service user is performed based on a program that is shared using the blockchain.

The agreement account information includes an agreement ID, information on a party to the agreement, information on the contents of the agreement, information that specifies the electronic equipment 300 that is a target to which a service is provided, and the like.

The agreement ID is information that uniquely specifies the agreement. The agreement information is a name of the service user that is the party to the agreement, or is ID information. It is noted that a given party to the agreement is not prevented from making multiple agreements for service utilization. The information that specifies the electronic equipment 300 is information that specifies the electronic equipment 300 that is a target to which a consumable item is delivered. Various pieces of information, such as a serial number of a MAC address of the electronic equipment 300, are available as pieces of information that specify the electronic equipment 300.

The information on the contents of the agreement in the consumable-item delivery service is information that includes a type of agreement, an agreement date, a delivery destination, a delivery method, a charging method, and the like. Furthermore, when a destination that places an order for a consumable item is determined, the information on the contents of the agreement may include information indicating an ordering destination.

The type of agreement is information indicating which delivery service of automatic delivery of a printing medium, automatic delivery of ink, automatic delivery of toner, and the like is provided. It is noted that the type of agreement may include information that specifies sizes and types of printing media, such as an A4 sized paper sheet, a rolled paper sheet, and a piece of cloth. The agreement date is information that indicates a timing at which the billing processing is performed on a consumable item that is automatically delivered. The delivery destination is information, such as an address that indicates a delivery destination of a consumable item. The delivery method is information that specifies a delivery company or a delivery time. A charging method is information that specifies a destination of a bill and a method for sending the bill, which are necessary when requesting the service user to make a payment of a cost of a consumable item.

It is noted that a price of a consumable item may be fixed and may be variable from one service user to another. When a price of a consumable item is variable, the information on the contents of the agreement includes a unit price and discount information. The unit price is information that is a billing amount per unit quantity, and for example, is information that is a price in Japanese Yen per one given paper-sheet size and is information that is a price in Japanese Yen per one milliliter of ink. The discount information, for example, is information that is a discount rate indicating how much a billing amount is discounted when a one-time order quantity is equal to or greater than the prescribed number of paper sheets, or is equal to or greater than a prescribed amount of ink.

Furthermore, the agreement management contract manages the smart contract information that specifies a processing program which is necessary when providing a service, in an associated manner, in addition to the agreement account information and the information indispensable for service registration. In the consumable-item delivery service, a remaining quantity collection contract, a warning state verification contract, and an ordering contract are made, and thus an arrangement of delivery of a consumable item is made. Of these, the agreement management contract manages, as the smart contract information, information indicating at least the remaining quantity collection contract and the warning state verification contract, which need to be invoked by the agreement management contract itself. Furthermore, in the consumable-item delivery service, a billing contract and a charging contract, which will be described below, are made, and thus billing processing and charging processing relating to a consumable item that is delivered are performed. Of these, the agreement management contract manages, as the smart contract information, information indicating at least the agreement management contract that needs to be invoked by the agreement management contract itself.

Furthermore, the agreement management contract manages execution timing information indicating a timing at which a processing program that is indicated by the smart contract describe above is executed. In the consumable-item delivery service, the agreement management contract manages information indicating a timing at which each of the remaining quantity collection contract and the warning state verification contract is made. It is noted that with the processing program, an execution timing is determined by an agreement. For example, a timing at which the billing contract is made varies from one service user to another, and is specified by an "agreement date" in the information on the contents of the agreement.

As described above, the agreement management contract manages the agreement account information, the information indispensable for service registration, the smart contract information, and the execution timing information in an associated manner. By managing the agreement account information and the information indispensable for service registration in an associated manner, it is possible that the agreement between the service provider and the service user is managed properly. Furthermore, because the smart contract information and the execution timing information are also associated, in order to realize a service, it is also possible to specify which processing program may be performed at which timing.

The agreement management contract executes a different program that is executed periodically, and, according to a condition designated in advance, is written by the smart contract into the blockchain. The agreement management contract itself may have a function that is performed periodically. Alternatively, the agreement management may activate a different program that is activated periodically from the outside and, in a case where a necessary stack is present, is written into the blockchain.

The agreement management contract periodically activates a remaining quantity computation contract and the warning state verification contract and thus performs processing that places an order for a consumable item. Furthermore, the agreement management contract activates the billing contract at a timing that corresponds to the agreement date, and performs the billing processing that accompanies the placing of an order for a consumable item.

Remaining Quantity Collection Contract

The processing unit 110 of the providing apparatus 100 generates a transaction for registering with the blockchain the remaining quantity collection program that collects data on a status of use of a consumable item for the electronic equipment 300. The remaining quantity collection program is a program that is activated by the agreement management program according to a given schedule. The remaining quantity collection program that is written into the blockchain using the smart contract is expressed as the remaining quantity collection contract. When this is done, it is possible that the data of the status of the use of the consumable item is collected based on the program that is shared using the blockchain.

The data on the status of the use here is data that is used for specifying a remaining quantity of consumable items, and for example, is a remaining quantity of ink or a remaining quantity of toner. Furthermore, the data on the status of the use includes a quantity of consumed printing media. The quantity of consumed printing media may be the number of printing sheets and may be a length of a printing portion of a rolled paper sheet. Based on the amount of consumed printing sheet, it is possible that a remaining quantity of printing media is computed.

The data on the status of the use, for example, is acquired in compliance with a simple network management protocol (SNMP). In this instance, the processing apparatus 200 that makes the remaining quantity collection contract is a director of communication, and each electronic equipment 300 is an agent of communication. By executing a collection program, the processing apparatus 200 performs communication in compliance with the SNMP and receives management information base (MIB) information from the electronic equipment 300.

Furthermore, the remaining quantity collection contract performs processing that registers the acquired data on the status of the use with the blockchain. Specifically, a transaction including the data on the status of the use is generated, and issuing processing for registering the transaction with the blockchain. When a consensus is built based on the consensus algorithm, a block including the transaction is added to the blockchain, and it is possible that each node makes reference to the data on the status of the use.

The agreement management contract designates the agreement ID and the information that specifies the electronic equipment 300 that is a collection target, and activates the remaining quantity collection contract. The remaining quantity collection contract acquires the data on the status of the use of the designated electronic equipment 300. As described above, the agreement management contract manages the execution timing information that specifies a timing at which a different contract is made. The agreement management contract activates the remaining quantity collection contract according to the execution timing information, and thus it is possible that the data on the status of the use is collected at a proper timing that is determined by the service provider. Various modification implementations of a specific activation timing are possible, and a collection contract is made with somewhat high frequency, such as one time every 30 minutes or one time every one hour. When this is done, it is possible that a state where a consumable item runs out is detected without delay if possible.

Furthermore, a timing at which the data on the status of the use may be determined by the agreement between the service provider and the service user. In that instance, the information on the contents of the agreement includes a rule for collecting a remaining quantity. The agreement management contract activates the remaining quantity collection contract according to the rule for collection a remaining quantity, and thus it is possible that the data on the status of the use is collected at a proper timing in accordance with the contents of the agreement.

Remaining Quantity Computation Contract

The processing unit 110 of the providing apparatus 100 generates a transaction for registering with the blockchain the remaining quantity computation program that performs remaining quantity computation based on the data on the status of the use of the consumable item. The remaining quantity computation program is a program that is activated by the remaining quantity collection program. It is noted that if it is considered that the state where the consumable item runs out is detected without delay if possible, it is desirable that the remaining quantity computation program is activated each time remaining quantity collection is ended. The remaining quantity computation program that is written into the blockchain using the smart contract is expressed as the remaining quantity computation contract. When this is done, it is possible that computation processing that is based on the data on the status of the use, which is collected by the remaining quantity collection contract, is performed based on the program that is shared using the blockchain.

The remaining quantity computation contract receives the agreement ID and the information that specifies the electronic equipment 300, from the remaining quantity collection contract, and, based on the data on the status of the use that is saved in the blockchain, computes the remaining quantity of each consumable item. The remaining quantity computation contract sets a value of the remaining quantity of ink collected from each electronic equipment 300, to be a remaining quantity of ink. This is also the same for the amount of toner. Furthermore, the remaining quantity computation contract subtracts an increase in a quantity of printing that is currently collected, from a previous remaining quantity, for every paper-sheet size and thus calculates the remaining quantity of printing media.

Based on the remaining quantity of ink, the remaining quantity of toner, the remaining quantity of printing media, and the like, which are obtained, the remaining quantity computation contract determines whether or not the remaining quantity is insufficient. It is noted that the remaining quantity computation contract performs processing on a consumable item that is a target for the consumable-item delivery service in the agreement, and processing on other types of consumable items is omissible. For example, the remaining quantity computation contract sets in advance a threshold against which each of the remaining quantity of ink, the remaining quantity of toner, and the remaining quantity of printing media is determined as being insufficient, and when the obtained remaining quantity falls below the threshold, the remaining quantity is determined as being insufficient.

When the remaining quantity is determined as being insufficient, the remaining quantity computation contract sets an agreement ID and a type of consumable item, which is determined as being insufficient, as parameters and activates the ordering contract.

It is noted that, as described above, the quantity of consumed media is collectible from the electronic equipment 300. In order to correctly compute the remaining quantity of printing media, there is a need to correctly record an initial value, there is a need to add a consumable item to be delivered, there is a need not to purchase a printing medium in other than the present service providing platform, and so on. Alternatively, when a printing medium is purchased in other than the present service providing platform, it is possible that a user inputs a quantity of purchase. The inputting, for example, is performed in the electronic equipment 300 or the processing apparatus 200, and information that is input is written into the blockchain in a manner that is associated with the agreement ID, the information that specifies the electronic equipment 300, and the like.

Warning State Verification Contract

The processing unit 110 of the providing apparatus 100 generates a transaction for registering with the blockchain the warning state verification program that verifies whether or not a warning state that is based on a consumable-item shortage is entered. The warning state verification program is activated by the agreement management program according to a given schedule. The warning state verification program that is written into the blockchain using the smart contract is expressed as the warning state verification contract. When this is done, it is possible that processing which verifies the warning state that is based on the consumable-item shortage is performed based on the program that is shared using the blockchain.

The warning state verification contract acquires data on a state of the electronic equipment 300. The data on the state is information that possibly identifies whether or not an error state rising from at least the consumable-item shortage is attained. Furthermore, the data on the state here may be one of pieces of information that possibly identify other states. These other states include a normal operation state, an idle state, and an error state other than the consumable-item shortage, and the error state other than the consumable-item shortage, for example, is a state where a paper jam, a component failure, or the like occurs. In the same manner as the data on the status of the use is collected, the data on the state, for example, is acquired in compliance with the SNMP.

When it is determined that the electronic equipment 300 is in a state of being warned of the consumable-item shortage, the warning state verification contract sets the agreement ID and the type of consumable item in short supply as parameters and activates the ordering contract.

It is noted that a state where a printer runs out of ink is equivalent to the warning state arising from the shortage of a consumable item here. A state where a printing medium such as a printing paper sheet runs out is detectable, but when considering paper sheets in stock, there is also a likelihood that a paper sheet will not run out. Because of this, it cannot be determined whether or not a consumable item has to be delivered. Furthermore, there is a likelihood that a shortage of a printing medium will be detected in the remaining quantity computation contract. Consequently, the warning state verification contract regards a warning that a paper sheet runs out, as not being a target.

The agreement management contract designates the agreement ID and the information that specifies the electronic equipment 300 that is a collection target, and activates the warning state verification contract. The warning state verification contract acquires the data on the state of the designated electronic equipment 300. The agreement management contract activates the remaining quantity collection contract according to the execution timing information, and thus it is possible that the data on the status of the use is collected at a proper timing that is determined by the service provider. Various modification implementations of a specific activation timing are possible, and in the same manner as the collection contract, the warning state verification contract is activated with somewhat high frequency, such as one time every 30 minutes or one time every hour. When this is done, it is possible that the state where a consumable item runs out is detected without delay if possible. Alternatively, if an interval for the warning state verification that is designated in advance elapsed after warning states of all pieces of electronic equipment 300 that are targets were verified completely, the agreement management contract may verify the next warning state. The interval for the warning state verification, for example, is one minute.

Furthermore, a timing at which the data on the state is collected may also be determined by the agreement between the service provider and the service user. In that instance, the information on the contents of the agreement includes a rule for verifying a warning state. The agreement management contract activates the warning state verification contract according to the rule for verifying a warning state, and thus it is possible that the warning state is verified at a proper timing in accordance with the contents of the agreement.

Ordering Contract

The processing unit 110 of the providing apparatus 100 generates a transaction for registering with the blockchain the ordering processing program for performing processing which places an order for the consumable item for the electronic equipment 300 that is a management target. The ordering processing program is activated by the remaining quantity computation program. Furthermore, the ordering processing program is activated by the warning state verification program. The ordering processing program that is written into the blockchain using the smart contract is expressed as the ordering contract. When this is done, it is possible that the processing which places an order for a consumable item is performed based on the program that is shared using the blockchain.

The remaining quantity computation contract or the warning state verification contract sets the agreement ID and the type of consumable item in short supply as parameters and activates the ordering contract. Based on the agreement ID, the ordering contract acquires a delivery destination, a delivery method, and the like from the agreement management contract. The agreement management contract performs processing that delivers a consumable item, which corresponds to the type of consumable item in short supply, to the delivery destination using a method in accordance with the delivery method. Actual delivery processing is performed in other than the blockchain, and thus a detailed description thereof is omitted. Furthermore, the ordering contract saves ordering data including an amount for an order, in the blockchain.

It is noted that the ordering contract performs processing that places an order with the ordering destination, which is indicated by ordering destination information, for a consumable item. For example, when the service provider is a vendor of a consumable item, the ordering destination that is indicated by the ordering destination information is the service provider. For example, the ordering destination information is managed by the ordering contract. More specifically, the ordering contract is realized as a processing program that performs the ordering processing with the service provider as the ordering destination.

However, the service provider is not prevented from placing an order with a vendor of a consumable item other than the service provider, for the consumable item. For example, with which ordering destination an order is placed may be determined in the agreement between the service provider and the service user. In this instance, the ordering destination information is managed by the agreement management program.

As described above, various modification implementations of the ordering destination are considered. For example, the ordering destination information may be information indicating a sales agent of the electronic equipment 300 (that is, a trader that sells the electronic equipment 300). In this instance, for the perspective of the service user, the sales agent of the electronic equipment 300 and the ordering destination of a consumable item (that is, a trader that receives an order for the consumable item and provides the consumable-item delivery service) are the same. Because of this, a load is reduced such as an inquiry relating to the electronic equipment 300.

Billing Contract

As described above, the ordering processing program performs processing that writes the ordering data including an expense that occurs when placing an order, into the blockchain. Based on the ordering data written into the blockchain, the processing unit 110 of the providing apparatus 100 generates the transaction for registering with the blockchain the billing processing program that determines a billing amount. The billing processing program is a program that is activated by the agreement management program. The billing processing program that is written into the blockchain using the smart contract is expressed as the billing contract. When this is done, it is possible that the billing processing that accompanies the placing of an order for a consumable item is performed based on the program that is shared using the blockchain.

As described above, the agreement management contract retains information that is an agreement date. The agreement date that is information indicating a date that serves as a reference date for the billing processing, and for example, is information such as the last of the month. However, a periodicity of setting of the agreement date is not limited to one time every month, and the agreement may be set with a different periodicity such as one time every two months. The agreement management contract activates the billing contract, and thus it is possible that the billing processing is performed at a proper timing.

The billing contract determines a billing amount for every agreement account. The agreement management contract sets the agreement ID and the agreement date as parameters and activates the billing contract. For every agreement ID, the billing contract acquires and accumulates amounts of ordering from a previous agreement date to a current agreement date, among pieces of ordering data that are saved in the blockchain.

Charging Contract

The processing unit 110 of the providing apparatus 100 generates a transaction for registering with the blockchain a charging program for charging a corresponding agreement account the billing amount determined by the billing processing program. The charging program is a program that is activated by the billing processing program. The charging program that is written into the blockchain using the smart contract is expressed as the charging program. When this is done, it is possible that the charging for the billing amount determined by the billing contract is performed based on the program that is shared using the blockchain.

The billing contract sets the agreement ID and the billing amount as parameters, and activates the charging contract. The charging contract inquires of the agreement management contract based on the acquired agreement ID and acquires a charging method corresponding to the agreement ID. The charging method is a destination for charging or a method of sending for charging, and the method of sending for charging is by a mail, an electronic mail, or the like. The charging contract sends a bill according to the acquired charging method. When this is done, it is possible that a proper agreement account corresponding to the service user is charged. It is noted that when a payment is made using a virtual currency, the sending of the bill is a payment request on the blockchain.

Payment Contract

Furthermore, the processing apparatus 200 generates a transaction for registering with the blockchain a payment program that makes a payment in response to the charging by the charging program. The payment program is a program that makes a payment using the virtual currency in the blockchain. Furthermore, the payment program is a program that is activated by the charging program. The payment program that is written into the blockchain using the smart contract is expressed as a payment contract. When this is done, it is possible that a payment in response to the charging by the charging contract is made based on the program that is shared using the blockchain.

Because the payment contract is a contract that makes a payment using the virtual currency, there is a need to register the service user with the blockchain for every service user. Consequently, in the processing apparatus 200, processing for generating the payment contract and processing for registering with the blockchain are performed. It is noted that in the blockchain technology, a program that generates a program is also allowed to be written by the smart contract into the blockchain. For example, the providing apparatus 100 may provide a program for generating the payment contract generation, using the smart contract, and by executing the program, the processing apparatus 200 may generate its own payment contract for payment. The payment contract, for example, is a program that retains an address of the service user as a transmittance source of the virtual currency.

The charging contract sets the bill as a parameter and activates the payment contract. The bill is information that designates an address of the remittance destination and the amount of remittance. The payment contract performs processing that makes a payment of the charged amount using the virtual currency, from an address of the service user, which is retained, to an address destination of the virtual currency, which is designated on the bill.

4.1.2 Specific Example of Blockchain

As described above, the providing apparatus 100 according to the present embodiment performs processing that writes each processing program into the blockchain using the smart contract. Specifically, the processing unit 110 of the providing apparatus 100 performs processing that generates a transaction for registering each processing program with a block in the blockchain. The generated transaction is broadcast to the blockchain network NW.

The agreement management contract is a processing program for managing the service user and the service provider. For this reason, the agreement management contract performs processing for writing into the blockchain in the providing apparatus 100 of the platform manager. The processing program for each of the remaining quantity collection, the remaining quantity computation, the warning state verification, the billing, and the charging may be written from the providing apparatus 100 of the platform manager and may be written from the providing apparatus 100 of the service provider. For example, the program for each of the remaining quantity collection, the remaining quantity computation, and the warning state is a program that determines service contents that are to be provided. When the service provider provides its own independent service, these processing programs are written from the providing apparatus 100 of the service provider. Alternatively, such these processing programs may be written, as general-purpose services, from the providing apparatus 100 of the platform manager. If the service provider desires to perform billing according to its own independent rule, the processing program for each of the billing and the charging is written from the providing apparatus 100 of the service provider. Alternatively, because a processing program relating to the billing or the charging is also usable in various services, the processing program may be written by the providing apparatus 100 of the platform manager into the blockchain and may be utilized in a general-purpose manner in many services. In addition, various modification implementations in which each processing program is written from any providing apparatus 100 except for the agreement management contract are possible.

Furthermore, the processing apparatus 200 performs the processing that writes the payment program into the blockchain using the smart contract. The processing apparatus 200 performs processing that generates a transaction for registering with a block in the blockchain the payment contract.

A flow that is to be followed after the transaction is generated is as described above with reference to FIG. 4. Specifically, processing that uses the consensus algorithm is performed, and, when a consensus is built, a block into which a transaction is written is added to the blockchain.

Figure 7:
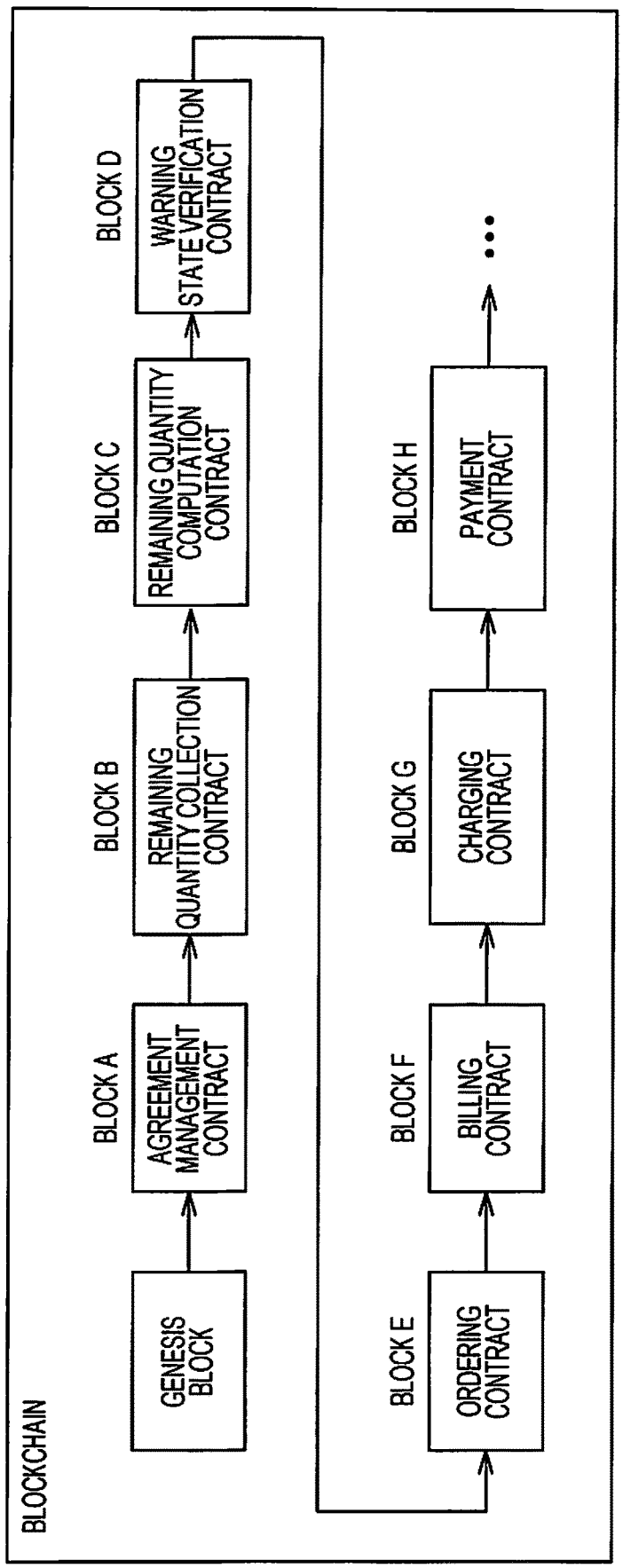
FIG. 7 is a diagram illustrating an example of a blockchain according to the present embodiment.

FIG. 7 is an example of the blockchain according to the present embodiment. Written into a block A is a transaction that includes the agreement management contract. Written into a block B is a transaction that includes the remaining quantity collection contract. Written into a block C is a transaction that includes the remaining quantity computation contract. Written into a block D is a transaction that includes the warning state verification contract. Written into a block E is a transaction that includes the ordering contract. Written into a block F is a transaction that includes the billing contract. Written into a block G is a transaction that includes the charging contract. Written into a block H is a transaction that includes the payment contract.

The blocks A to H are added to the blockchain, and thus it is possible that each node on the blockchain network NW performs each processing operation relating to the consumable-item delivery service. It is noted that FIG. 7 is an example in which a structure of the blockchain is illustrated, and that the order in which programs are written into the blockchain using the smart contract. Furthermore, multiple contracts may be written into one block.

It is possible that the blockchain includes not only a program that is written by the smart contract which is illustrated in FIG. 7, but also arbitrary data that is communicated over the blockchain network NW. The data that is written into the blockchain, for example, may be data indicating a result of executing a program, may be information indicating trading of the virtual currency, and may be any other data. The result of the execution may be the data on the status of the use, which is a result of executing the remaining quantity collection contract, may be the ordering data that is a result of performing the ordering contract, and may be a result of executing a program that is not illustrated in FIG. 7. Furthermore, the information indicating the trading of the virtual currency may be a result of performing the payment contract and may be information indicating a result from the trading of the virtual currency, which is different from payment processing according to the present embodiment.

4.1.3 Detail of Processing

Next, processing according to the present embodiment is described in detail. It is noted that each program is described above as undergoing the processing that is illustrated in FIG. 4 and being written into the blockchain using the smart contract.

When an agreement relating to the consumable-item delivery service is made between the service provider and the service user, processing that registers the agreement account information with the blockchain is first performed. In the agreement, pieces of information that are a type of agreement, a unit price, discount information, a delivery destination, a delivery method, an agreement date, and a charging method, which are managed by the agreement management contract, are determined. Each piece of information is as described above. It is noted that, when the smart contract is used in the agreement, with the completion of the processing that registers the agreement account information, the agreement may be regarded as being made.

Figure 8:
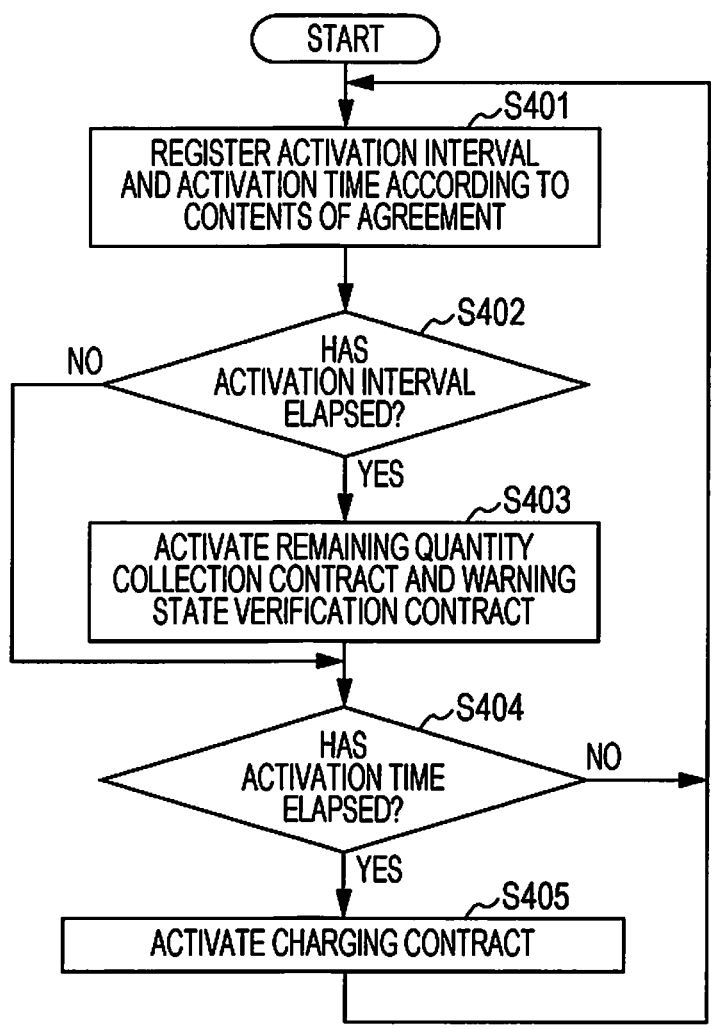
FIG. 8 is a flowchart for describing periodic execution processing in a consumable-item delivery service.

FIG. 8 is a flowchart for describing processing that performs the agreement management contract. It is noted that the providing apparatus 100 of the platform manager is described below as making the agreement management contract to perform each step in FIG. 8. However, it is assumed that the providing apparatus 100 of the platform manager is registered with the blockchain of the agreement management contract, the agreement account information is written, and so on, but that the processing which is illustrated in FIG. 8 is not necessarily performed. Each step that will be described with reference to FIG. 8 may be performed in the providing apparatus 100 of the platform manager, may be performed in the providing apparatus 100 of the service provider, and may be performed in a different node such as the processing apparatus 200. In a broad sense, any node on the blockchain network NW performs a program that is provided using the smart contract, in the environment of execution within the node, and thus each step is realized. This is also the same for the flowchart in FIG. 9 and subsequent figures, and a specific apparatus is described as performing a processing program to perform processing in each step in the flowchart. However, the processing may be performed in a different node on the blockchain network NW.

First, based on the execution timing information, the providing apparatus 100 registers activation intervals for the remaining quantity collection contract and the warning state verification contract. Furthermore, based on the agreement date that is the information on the contents of the agreement, the providing apparatus 100 registers an activation time for the billing contract (S401). The activation interval, for example, is a time, such as 30 minutes or one hour. The agreement date, for example, is information, such as "09:00 on the 21st day of the month," and "08:00 on the days at the beginning of the month."

Next, the providing apparatus 100 compares the time from when the previous remaining quantity collection contract and warning state verification contract are activated to a current time and the activation interval acquired in S401, and thus determines whether or not the activation interval elapsed (S402). When it is determined that the activation interval elapsed (Yes in S402), the providing apparatus 100 activates the remaining quantity computation contract and the warning state verification contract (S403). When No is a result of the determination in S402, the processing in S403 is not performed.

Next, the providing apparatus 100 compares the current time and the activation time acquired in S401, and thus determines whether or not the activation time elapsed (S404). When it is determined that the activation time elapsed (Yes in S404), the providing apparatus 100 activates the billing contract (S405). When No is a result of the determination in S404, the billing contract is not activated. After the processing in S405, or when No is a result of the determination in S404, returning to S402 takes place and the processing is repeated.

By performing the processing in FIG. 8, it is possible that the remaining quantity collection contract and the warning state verification contract, which are in accordance with a prescribed interval, are activated and that the billing contract at the agreement date is activated. It is noted that the agreement management contract has a function that is performed periodically. That is, the agreement management contract may periodically perform the processing that is illustrated in FIG. 8, using its own function.

Alternatively, the agreement management contract may not have the function that is performed periodically and an external program may periodically activate the agreement management contract. In this instance, the external program does not know a rule for collecting the data on the status of the use, or information that is the agreement date. Therefore, the external program periodically activates the agreement management contract at an arbitrary interval, such as every minute, every five minutes, every 30 minutes, and every hour. The agreement management contract performs the processing that is illustrated in FIG. 8, each time the activation is performed. For example, when information as the agreement date is acquired such as 09:00 on the 21st of the month (an A company) or 08:00 on the days at the beginning of the month (a B company), it is assumed that the agreement management contract is activated from an external program at 09:03 on the 21st day of a certain month. In this instance, the agreement management contract activates the billing contract according to the agreement date "09:00 the 21st day of every month (the A company).

It is noted that in the processing which is illustrated in FIG. 8, the activation interval that is an interval from given activation of the warning state verification contract to the next activation is controlled. However, the control of the activation of the warning state verification contract is not limited to this. For example, an interval from when verification processing that accompanies given activation of the warning state verification contract to the next activation may be controlled.

Figure 9:
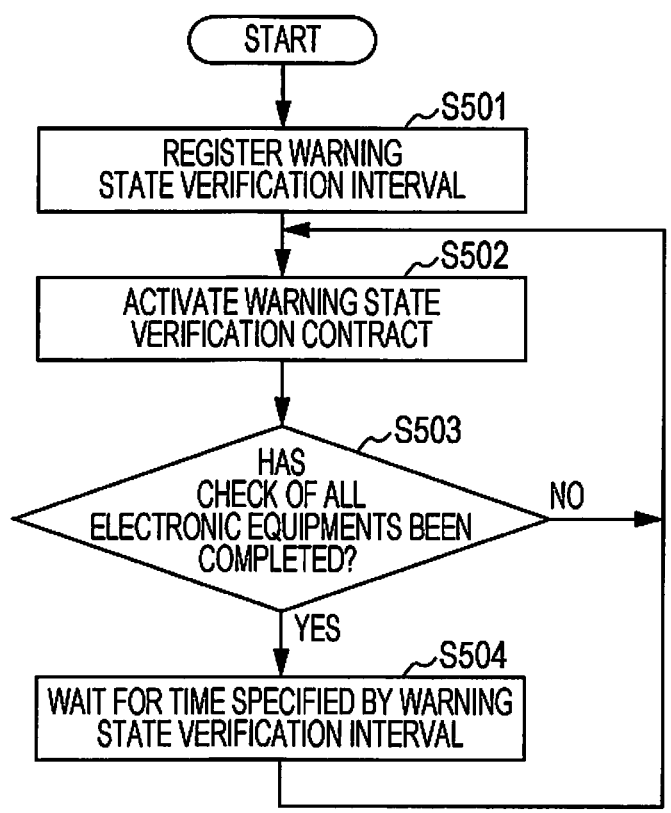
FIG. 9 is a flowchart for describing the periodic execution processing in the consumable-item delivery service.

FIG. 9 is a different flowchart for describing periodic activation processing of the warning state verification contract by the agreement management contract. When this processing is started, first, the providing apparatus 100 that makes the agreement management contract registers the interval for the warning state verification, based on the execution timing information (S501). The interval for the warning state verification, for example, is a relatively short time of appropriately one minute.

Next, the providing apparatus 100 activates the warning state verification contract (S502). Then, the providing apparatus 100 determines whether or not warning states of all pieces of electronic equipment 300 that are verification targets are verified completely (S503). When the verification is not completed, returning to S502 takes place, and the processing is performed on different electronic equipment 300 that is a verification target. When the verification is completed, the providing apparatus 100 waits only a time designated by the interval for the warning state verification thereafter (S504), and then returns to S502 and reactivates the warning state verification contract. When processing that is illustrated in FIG. 9 is performed, the warning state verification contract repeats its operation except during a duration that is a relatively short interval for the warning state verification. Because of this, it is possible that occurrence of the warning state in the electronic equipment 300 is detected promptly.

Figure 10:
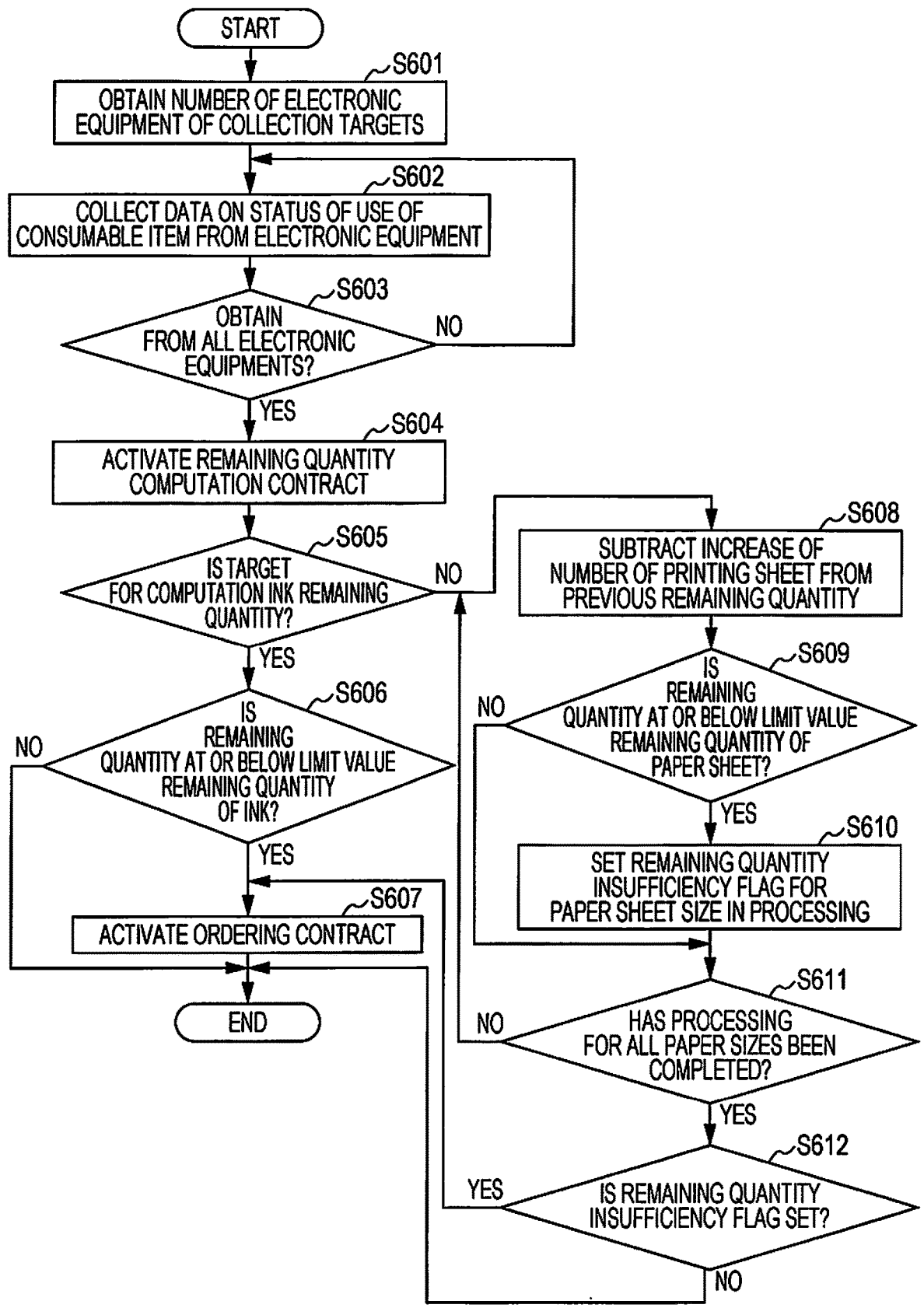
FIG. 10 is a flowchart for describing collection of a remaining quantity of a consumable item and processing that computes the remaining quantity of the consumable item.

FIG. 10 is a flowchart for describing processing by each of the remaining quantity collection contract and the remaining quantity computation contract. When the remaining quantity collection contract is activated in S403 in FIG. 8, the processing apparatus 200 that makes the remaining quantity collection contract first acquires information that specifies the electronic equipment 300 that is a collection target, from the agreement management contract (S601). In the processing in S601, for example, the number of pieces of electronic equipment 300 that are collection targets is obtained. The processing apparatus 200 collects pieces of data on the status of the use of a consumable item, such as the number of printing sheets and a remaining quantity of ink, from the electronic equipment 300 that is a target (S602). The processing apparatus 200 gives the collected data the information that specifies the electronic equipment 300 and a collection time, and performs the processing for writing into the blockchain. Next, the processing apparatus 200 determines whether or not the collection of the data on the status of the use from all pieces of electronic equipment 300 that are targets is completed (S603). When the electronic equipment 300, the data of the status of whose use is not collected, remains, (No in S603), returning to S602 takes place and the collection is continued. When the collection from all pieces of electronic equipment 300 is completed (Yes in S603), the processing apparatus 200 activates the remaining quantity computation contract (S604).

Processing in each of S605 and subsequent steps is performed by the remaining quantity computation contract. The providing apparatus 100 that makes the remaining quantity computation contract specifies a type of agreement based on the agreement ID acquired from the remaining quantity collection contract. Then, it is determined whether or not a target for remaining quantity computation is a remaining quantity of ink (S605). When the target is the remaining quantity of ink (Yes in S605), the providing apparatus 100 acquires the data on the status of the user, which includes information that is a remaining quantity of ink in the electronic equipment 300 that is a target, from the blockchain, and determines whether or not the remaining quantity of ink is at or below a limit value of the remaining quantity of ink (S606). When Yes is a result of the determination in S606, because the remaining quantity is determined as being insufficient, the providing apparatus 100 designates ink as the type of consumable item in short supply and activates the ordering contract (S607). When No is a result of the determination in S606, the ordering contract is not activated and the processing is ended.

On the other hand, when the target for remaining quantity computation is a printing medium (No in S606), the providing apparatus 100 keeps the following processing for every paper-sheet size in a closed loop. Specifically, the providing apparatus 100 acquires the data on the status of the use, which includes the number of printing sheets of the electronic equipment 300 that is a target, from the blockchain, and then, by subtracting the number of printing sheet from the previous remaining quantity, obtains a remaining quantity of paper sheets (S608). It is noted that the number of printing sheets here indicates an increase from the previous remaining quantity computation. It is noted that it is assumed that an initial value of the remaining quantity is set properly. Furthermore, when a printing paper sheet is purchased, a quantity of purchase is added to the remaining quantity.

Then, the providing apparatus 100 determines whether or not the obtained remaining quantity of paper sheets is at or below a limit value of the remaining quantity of paper sheets (S609). When Yes is a result of the determination in S609, because the remaining quantity is determined as being insufficient, the providing apparatus 100 sets a remaining quantity insufficiency flag for a paper-sheet size that is a target (S610). When No is a result of the determination in S609, or after the processing in S610, the providing apparatus 100 determines whether or not processing for all paper sheet sizes is completed (S611). When No is a result of the determination in S611, returning to S608 takes place and the processing is continued.

When Yes is a result of the determination in S611, the providing apparatus 100 determines whether or not the remaining quantity insufficiency flag is set for any paper-sheet size (S612). When the remaining quantity insufficiency flag is set (Yes in S612), the providing apparatus 100 designates a printing paper sheet of the corresponding size as the type of consumable item in short supply and activates the ordering contract (S607). When No is a result of the determination in S612, the ordering contract is not activated and the processing is ended.

Figure 11:
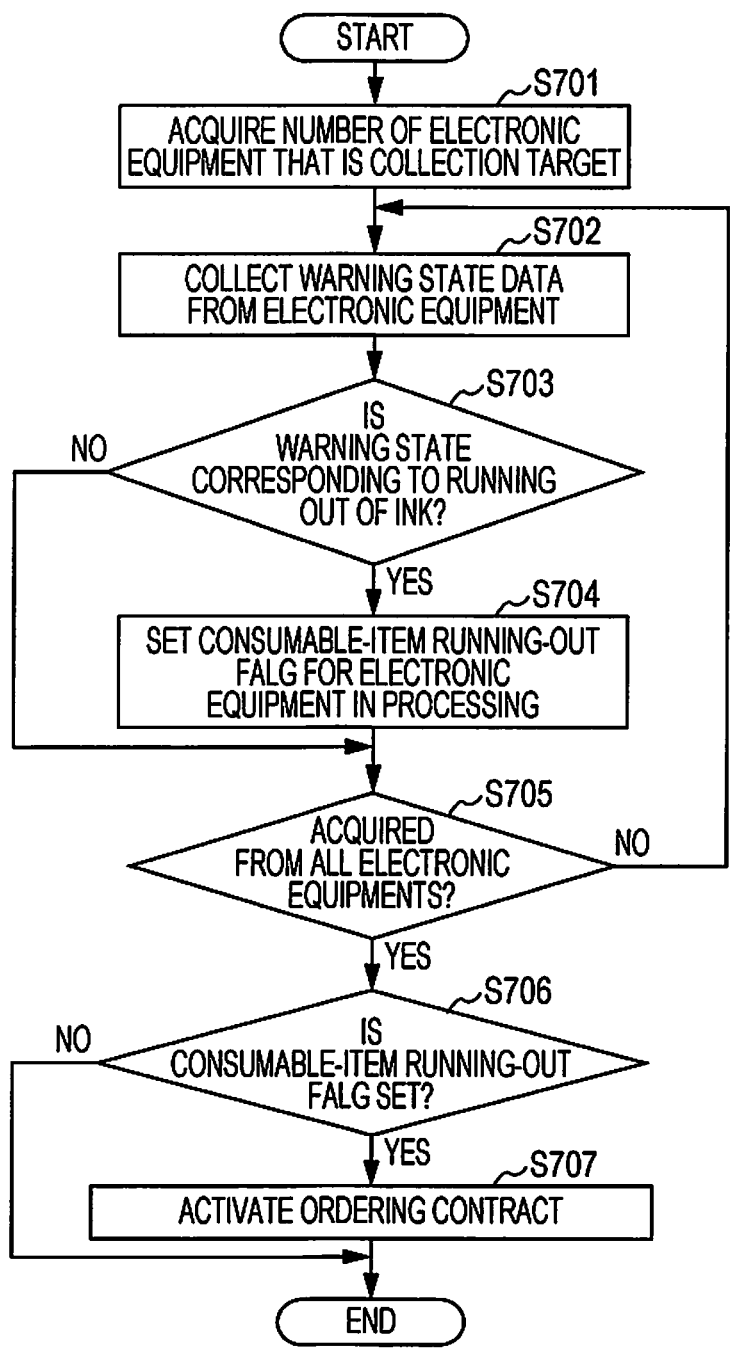
FIG. 11 is a flowchart for describing warning state verification processing.

FIG. 11 is a flowchart for describing processing by the warning state verification contract. When the warning state verification contract is activated in S403 in FIG. 8 or S502 in FIG. 9, the processing apparatus 200 that makes the warning state verification contract acquires the information that specifies the electronic equipment 300 that is a collection target, from the agreement management contract (S701). In the processing in S701, for example, the number of pieces of electronic equipment 300 that are collection targets is obtained. The processing apparatus 200 collects the data on the state that includes data indicating whether or not the warning state is attained, from the electronic equipment 300 that is a target (S702). Based on the collected data on the state, the processing apparatus 200 determines whether or not the electronic equipment 300 is in the warning state that corresponds to the state where ink runs out (S703). When Yes is a result of the determination in S703, a consumable-item running-out flag is set for the electronic equipment 300 that is a target (S704).

When No is a result of the determination in S703, or after the processing in S704, the processing apparatus 200 determines whether or not processing on all pieces of electronic equipment 300 is completed (S705). When No is a result of the determination in S705, returning to S702 takes place and the processing is continued.

When Yes is a result of the determination in S705, the processing apparatus 200 determines whether or not the consumable-item running-out flag is set for any electronic equipment 300 (S706). When the consumable-item running-out flag is set (Yes in S706), the processing apparatus 200 designates ink as the type of consumable item in short supply and activates the ordering contract (S707). When No is a result of the determination in S706, the ordering contract is not activated and the processing is ended.

Figure 12:
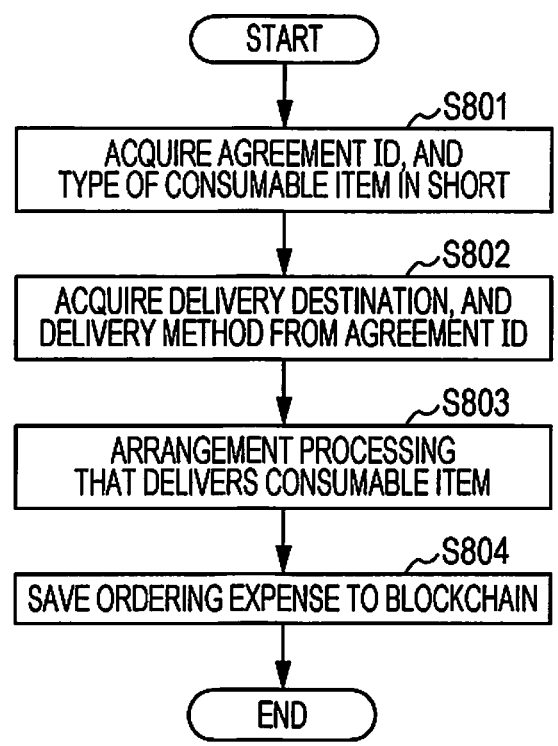
FIG. 12 is a flowchart for describing delivery arrangement processing.

FIG. 12 is a flowchart for describing processing by the ordering contract. First, when the ordering contract is activated, the providing apparatus 100 that makes the ordering contract acquires the agreement ID and the type of consumable item in short supply from the remaining quantity computation contract or the warning state verification contract (S801). Next, based on the acquired agreement ID, the providing apparatus 100 inquires of the agreement management contract and thus acquires the delivery destination and the delivery method (S802). The providing apparatus 100 performs arrangement processing that delivers a consumable item specified by the type of consumable item in short supply to a designated delivery destination using the designated delivery method (S803). Thereafter, the providing apparatus 100 performs processing that writes, to the blockchain, ordering data which includes the cost of the consumable item and the shipping charge (S804).

Figure 13:
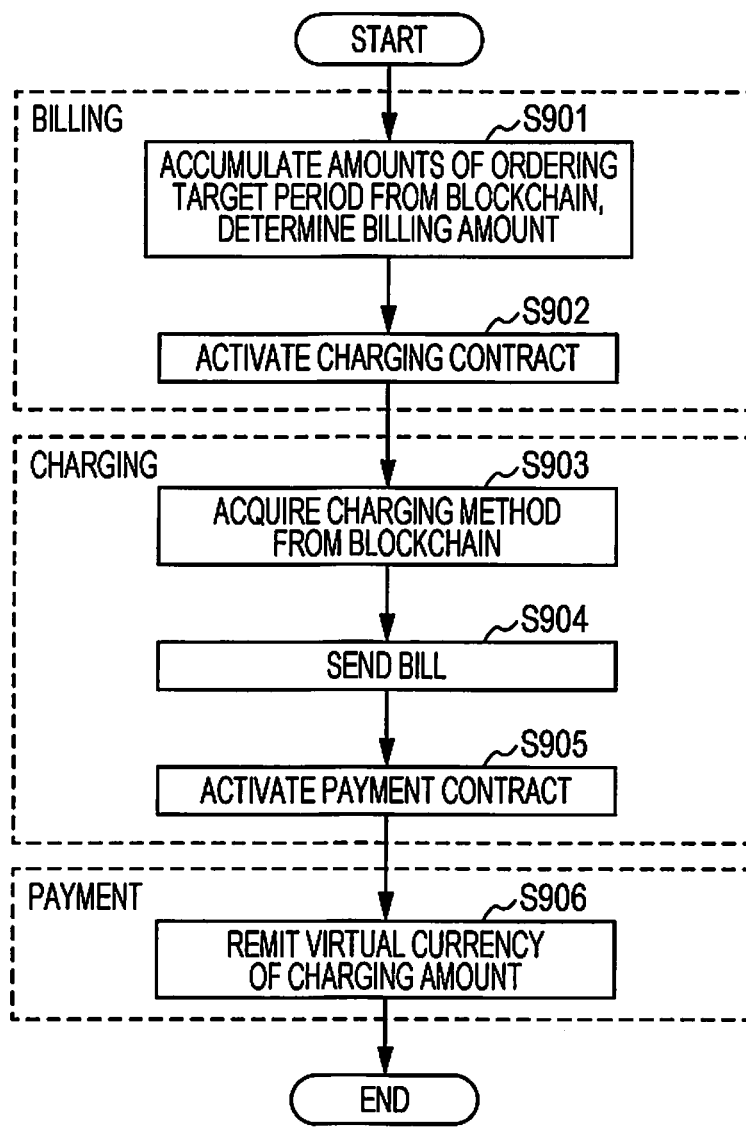
FIG. 13 is a flowchart for describing billing processing, charging processing, and payment processing.

FIG. 13 is a flowchart for describing processing by each of the billing contract, the charging contract, and the payment contract. In S405 in FIG. 8, the providing apparatus 100 that makes the billing contract sets the agreement ID and the agreement date as parameters and activates the agreement management contract. The providing apparatus 100 acquires and accumulates amounts of ordering from a previous agreement date to a current agreement date, among pieces of ordering data that are saved in the blockchain, and thus determines a billing amount (S901). When the billing amount is determined, the providing apparatus 100 sets the agreement ID and the billing amount as parameters and activates the charging contract (S902).

The providing apparatus 100 that makes the charging contract inquires of the agreement management contract based on the agreement ID that is acquired as a parameter, and acquires a destination as a charging method or information on a sending method (S903). The providing apparatus 100 sends a bill using the acquired method (S904). It is noted that, when a payment is made using a virtual currency, a bill in S904 is a request for payment on the blockchain. In order to make a request for payment, the charging contract sets an address for receiving its own virtual currency and a charging amount as parameters and activates the payment contract of the party to the agreement that is a target to be charged (S905).

The providing apparatus 100 that makes the payment contract sets an address of the party to the agreement, which is retained by the providing apparatus 100 itself, as an address for transmitting the virtual currency. Then, the providing apparatus 100 performs processing that writes trading data, which indicates that the corresponding charging amount is remitted from the transmission address to a reception address acquired as a parameter, into the blockchain (S906). Actual trading of the virtual currency takes place after the building of a consensus, which is based on the consensus algorithm, is approved.

It is noted that in the payment processing, when an account of the party to the agreement retains only a virtual currency that is smaller than the charging amount, the providing apparatus 100 may perform processing that writes an outstanding balance, as non-payment trading, into the blockchain. In that instance, the payment contract performs processing starting from the non-payment trading within the blockchain, when making a payment next time or subsequently, and thus makes a payment relating to the charging of the unpaid amount.

Thereafter, the processing that is illustrated in each of FIGS. 8 to 13 is also performed, and thus, the processing system 10 that automatically performs the consumable-item delivery service can be realized. By automating the processing on the blockchain, it is possible that the consumable-item delivery service is realized in only one system. It is noted that, as when a payment is made in response to the charging performed by a mail correspondence or an electronic mail without using the virtual currency, one portion of the processing relating to the consumable-item delivery service may be performed without involving the blockchain.

According to the present embodiment, by utilizing the blockchain technology, the service providing processing relating to the electronic equipment 300 can be automated. In the narrow sense, the service is the consumable-item delivery service, and the processing for each of the remaining quantity collection, the remaining quantity computation, the warning state verification, the ordering, the billing of the expense that occurs by the service, and the charging of the billing amount can be automated. Furthermore, by using the virtual currency on the same blockchain, it is possible that a payment which is based on the charging is also automated. In the blockchain technology, when data is written into the blockchain, a consensus is built by the consensus algorithm. Accordingly, the issued transaction is left without being written and thus the same transaction can be suppressed from being written two times. That is, it is possible not only that manual checking is not performed, but also that double delivery and non-delivery of a consumable item are suppressed, or that double billing or non-billing is suppressed.

4.2 Repair Contracting Service

Next, as another example of the service relating to the electronic equipment 300, the repair contracting service will be described. A specific example of the smart contract that is used in the repair contracting service is first described, and then a flow for processing is described with reference to a flowchart.

4.2.1 Smart Contract

Agreement Management Contract

The agreement management contract is the same as in the consumable-item delivery service. By managing the agreement account information and the information on the service provider, the agreement management contract manages the agreement between the platform manager and the service provider and the agreement between the service provider and the service user.

However, in order to realize the repair contracting service, the information on the contents of the agreement, which is included in the agreement account information, needs to be information indicating contents of an agreement relating to the repair contracting service, and the detailed contents of the agreement are different from those in the consumable-item delivery service. The information on the contents of the agreement in the repair contracting service is information that includes a warranty period, a type of repair, a yearly support agreement, a charging method, and the like.

The warranty period is information indicating a warranty period for the electronic equipment 300, and, for example, is information that specifies a starting date of the warranty period and a length of the warranty period. The type of repair is information that specifies whether a repair that requires a service visit or a repair that requires taking-back is performed. The yearly support agreement is information that indicates whether or not an agreement for reducing a repair expense is made, independently of the warranty period described above. The yearly support agreement, for example, includes pieces of information, such as a failure that is a target for reducing the repair expense, a support period, and an amount of reduction in the expense. It is noted that for brief description, an example where, if a repair is within an agreement range of the yearly support agreement, a repair is free of charge is described. The charging method is information that specifies a destination of a bill and a method for sending the bill, which are necessary when charges the service user a repair cost.

Furthermore, the repair contracting service is the same as the consumable-item delivery service in that the agreement management contract manages the smart contract information and the execution timing information in an associated manner. In the repair contracting service, an arrangement for a repair of the electronic equipment 300 is performed by making a state verification contract and a repair arrangement contract that will be described below. The agreement management contract manages information indicating the state verification contract that at least the agreement management contract itself needs to invoke, as the smart contract information. Furthermore, the agreement management manages information indicating a timing at which the state verification contract is made.

State Verification Contract

The service providing processing program includes the state verification program that performs at least one of processing that verifies an error state of the electronic equipment 300 and processing that determines whether a component of the electronic equipment 300 is replaced. The processing unit 110 of the providing apparatus 100 generates a transaction for registering with the blockchain the state verification program. The state verification program is activated by the agreement management program according to a given schedule. The state verification program that is written into the blockchain using the smart contract is expressed as the state verification contract. When this is done, it is possible that processing which verifies whether or not a state where a repair is necessary is attained is performed based on the program that is shared using the blockchain.

The state verification contract acquires the data on the state of the electronic equipment 300. The data on the state is information that possibly identifies whether or not an error state where a service call is necessary is attained. Furthermore, the state verification contract acquires the data on the status of the use of electronic equipment 300. The state verification contract determines whether a replacement period of time elapsed, based on information that is a quantity of components used and information that is the time for which a component is used, which are included in the data on the status of the use. The data on the state and the data on the status of the use are acquired according to the SNMP in the same as in an example of the consumable-item delivery service. It is noted that, with a type of the data on the state, the state verification contract is also not prevented from determining whether or not a period of time during which a component needs to be periodically replaced elapsed, based on the data on the state. Furthermore, the state verification contract here is not limited to performing both the processing that verifies the error state and the processing that determines whether or not a component is replaced, and, based on any processing, may determine whether or not the state where a repair is necessary is attained.

For example, when the electronic equipment 300 is a projector, the data on the status of the use is a time for which a light source of the projector emits light. The state verification contract determines whether or not a replacement is necessary, based on a total amount of time for which light is emitted and a durability time. Alternatively, the data on the status of the use may be an amount of movement of a moving portion of the electronic equipment 300, for example, an amount of rotation of a motor, or the like. Furthermore, the data on the status of the use, for example, may be information indicating a time for which the electronic equipment 300 is powered on, and may be information indicating a time for which a specific function of the electronic equipment 300 is used. Examples of the specific functions include are considered to have various functions, such as a printing function and a scanning function of a scanner.

When a state where any repair is necessary is verified, the state verification contract sets the agreement ID, the information that specifies the electronic equipment 300, and a specific state, as parameters, and activates the repair arrangement contract.

The agreement management contract designates the agreement ID and the information that specifies the electronic equipment 300 that is a collection target, and activates a state contract. The agreement management contract activates the remaining quantity collection contract according to the execution timing information, and thus it is possible that the data on the state is collected at a proper timing that is determined by the service provider. Various modification implementations of a specific activation timing are possible. If it is considered that the state where a repair is necessary is detected without any delay if possible, the state verification contract is activated with somewhat high frequency, such as one time every 30 minutes or one time every one hour. Alternatively, if an interval for verification of a state that is designated in advance elapsed after states of all pieces of electronic equipment 300 that are targets were verified completely, the agreement management contract may verify the next state. The interval for the verification of the state here, for example, is one minute.

Furthermore, the timing at which the data on the state is collected may be determined by the agreement between the service provider and the service user. In that instance, the information on the contents of the agreement includes a rule for verifying a state. The agreement management contract activates the state verification contract according to the rule for verifying a state, and thus it is possible that the warning state is verified at a proper timing in accordance with the contents of the agreement.

Repair Arrangement Contract

The service providing processing program includes a repair arrangement processing program for performing processing that arranges a repair of the electronic equipment 300, which is activated by the state verification program. The processing unit 110 of the providing apparatus 100 generates a transaction for registering with the blockchain the repair arrangement program. The repair arrangement program that is written into the blockchain using the smart contract is expressed as the repair arrangement contract. When this is done, it is possible that the processing that arranges the repair of the electronic equipment 300 is performed based on the program that is shared using the blockchain.

The repair arrangement contract performs the processing that arranges a repair. The repair arrangement contract receives the agreement ID, the information that specifies the electronic equipment 300, and a specific state from the state verification contract. The repair arrangement contract inquires of the agreement management contract based on the agreement ID, and thus arranges a repair in accordance with a type of repair in the information on the contents of the agreement. When the type of repair is the repair that requires a service visit, allocation of a person in charge of repairing and a date and time for repairing are determined. Regarding the date and time for repairing, the person in charge of repairing may be determined. On the other hand, when the type of repair is the repair that requires taking-back, delivery is arranged.

Furthermore, the repair arrangement contract allocates a repair ID to each repair item. For every repair ID, the repair arrangement contract provides a means of verifying a repair progress status, changing the progress status, and inputting a detail of the repair and a repair expense. A value that is input is saved in the blockchain. For example, an interface is provided through which the status of the repair item that is undertaken is possibly verified and changed and through which the detail of the repair and the repair expense are possibly input, in the form of a webpage, and information that is input using the interface is written into the blockchain.

When a repair expense relating to a given repair item is input, the repair arrangement contract sets the agreement ID, the repair item ID, the information that specifies the electronic equipment 300, and the repair expense as parameters, and activates the billing contract.

Billing Contract

The billing contract determines a billing amount for the repair item ID. The billing contract inquires of the agreement management contract based on the agreement ID acquired from the repair arrangement contract, and thus acquires pieces of information that are a warranty period, a type of repair, and the presence or absence of a yearly support agreement.

The billing contract performs processing that determines the billing amount based on the acquired information. When the warranty period did not elapse, or when the repair is included in the yearly support agreement, the billing contract sets the billing amount to 0. On the other hand, when the warranty period expires, when a repair is not within the yearly support agreement, or when the yearly support agreement, the billing contract adds a business-trip repair expense, a delivery fee, and the like properly to a repair expense received from the repair arrangement contract, and thus calculates the billing amount.

The billing contract performs processing that writes the calculated billing amount into the blockchain. Furthermore, the billing contract sets the agreement ID and the billing amount as parameters and activates the charging contract.

Charging Contract

The charging contract is the same as in the consumable-item delivery service. The billing contract sets the agreement ID and the billing amount as parameters, and activates the charging contract. The charging contract inquires of the agreement management contract based on the acquired agreement ID and performs the charging processing using the charting method corresponding to the agreement ID.

Payment Contract

The payment contract is also the same as in the consumable-item delivery service. The charging contract sets the bill as a parameter and activates the payment contract. The payment contract performs processing that makes a payment of the charged amount using the virtual currency, from an address of the service user, which is retained, to an address destination of the virtual currency, which is designated on the bill.

4.2.2 Specific Example of Blockchain

Figure 14:
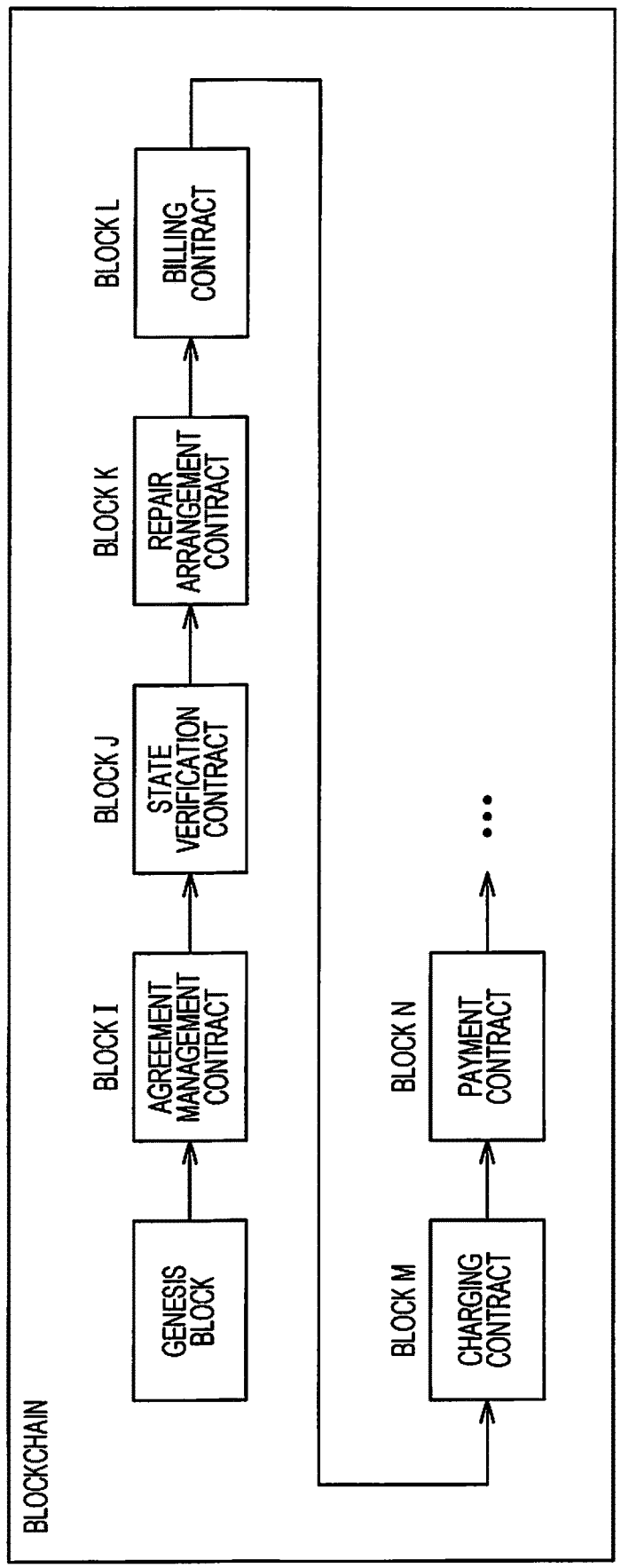
FIG. 14 is a diagram illustrating another example of the blockchain according to the present embodiment.

FIG. 14 is an example of the blockchain according to the present embodiment. Written into a block I is a transaction that includes the agreement management contract. Written into a block J is a transaction that includes the state verification contract. Written into a block K is a transaction that includes the repair arrangement contract. Written into a block L is a transaction that includes the billing contract. Written into a block M is a transaction that includes the charging contract. Written into a block N is a transaction that includes the payment contract.

The blocks I to N are added to the blockchain, and thus it is possible that each node on the blockchain network NW performs each processing operation relating to the repair contracting service.

It is noted that as described above, in the agreement management contract, some portion of information that is included in the information on the contents of the agreement is different, but is possibly set to be common to both of the consumable-item delivery service and the repair contracting service. When both the consumable-item delivery service and the repair contracting service are provided in the service providing platform, the agreement management contract that is included in the block A in FIG. 7 and the agreement management contract that is included in the block I in FIG. 14 do not need to be written independently, and any one of the contracts may be written. Furthermore, it is possible that the charging contract and the payment contract are also set to be common to multiple services. The block G and the block M, and the block H and the block N also do not need to overlap. A given processing program is utilized in multiple services, and thus it is possible that the providing of a service is realized efficiently in the service providing platform. For example, according to an embodiment, it is considered that a general-purpose processing program that is assumed to be utilized by multiple service providers is provided in advance by the platform manager.

4.2.3 Detail of Processing

Next, processing according to the present embodiment will be described in detail. It is noted that each program is described above as undergoing the processing that is illustrated in FIG. 4 and being written into the blockchain using the smart contract.

When an agreement relating to the repair contracting service is made between the service provider and the service user, the processing that registers the agreement account information with the blockchain is first performed. In the agreement, pieces of information that are a warranty period, a type of repair, a yearly support agreement, and a charging method are determined. Each piece of information is as described above.

Figure 15:
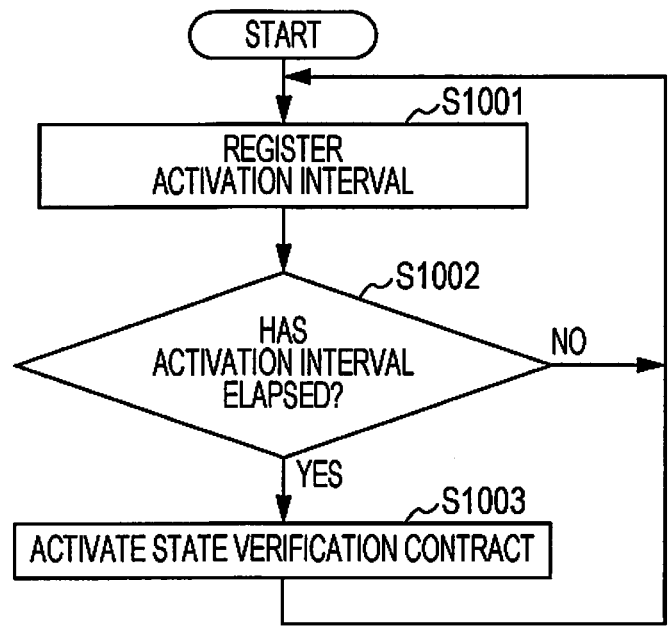
FIG. 15 is a flowchart for describing periodic execution processing in a repair contracting service.

FIG. 15 is a flowchart for describing the processing that performs the agreement management contract. The providing apparatus 100 that makes the agreement management contract registers an activation interval for the state verification contract, based on the execution-timing information (S1001). The activation interval, for example, is a time, such as 30 minutes or one hour.

Next, the providing apparatus 100 compares the time from when the previous state verification contract is activated to a current time and the activation interval acquired in S1001, and thus determines whether or not the activation interval elapsed (S1002). When it is determined that the activation interval elapses (Yes in S1002), the providing apparatus 100 activates the state verification contract (S1003). After the processing in S1003, when No is a result of the determination in S1002, returning to S1001 takes place and the processing is repeated.

By performing the processing in FIG. 15, it is possible that the state verification contract in accordance with a prescribed activation interval is activated. It is noted that in the consumable-item delivery service described above, because it is assumed that a consumable item is delivered with somewhat high frequency, it is possible that user convenience is improved by realizing the billing processing at the agreement date. For example, from a given agreement date onwards, although sending is set to be performed multiple times during a period that expires on the next agreement date, the frequency of charging or payment is suppressed. Compared with this, it is considered that the frequency of occurrence of a failure or the like that needs to be repaired is low. Consequently, an example is described where the billing processing is performed for every repair item. However, in the same manner as in the consumable-item delivery service, the billing processing may be performed for every agreement date.

Figure 16:
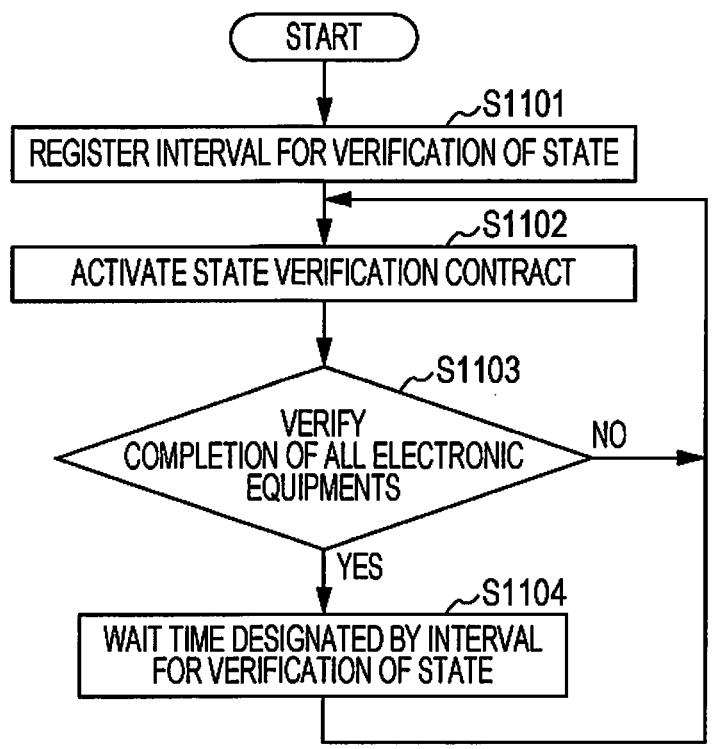
FIG. 16 is a flowchart for describing the periodic execution processing in the repair contracting service.

FIG. 16 is another flowchart for describing periodic activation processing of the state verification contract by the agreement management contract. When this processing is started, first, the providing apparatus 100 that makes the agreement management contract registers the interval for the verification of the state, based on the execution timing information (S1101). The interval for the verification of the state, for example, is a relatively short time of appropriately one minute.

Next, the providing apparatus 100 activates the state verification contract (S1102). Then, the providing apparatus 100 determines whether or not states of all pieces of electronic equipment 300 that are verification targets are verified completely (S1103). When the verification is not completed, returning to S1102 takes place, and the processing is performed on different electronic equipment 300 that is a verification target. When the verification is completed, the providing apparatus 100 waits only a time designated by the interval for the verification of the state thereafter (S1104), and then returns to S1102.

Figure 17:
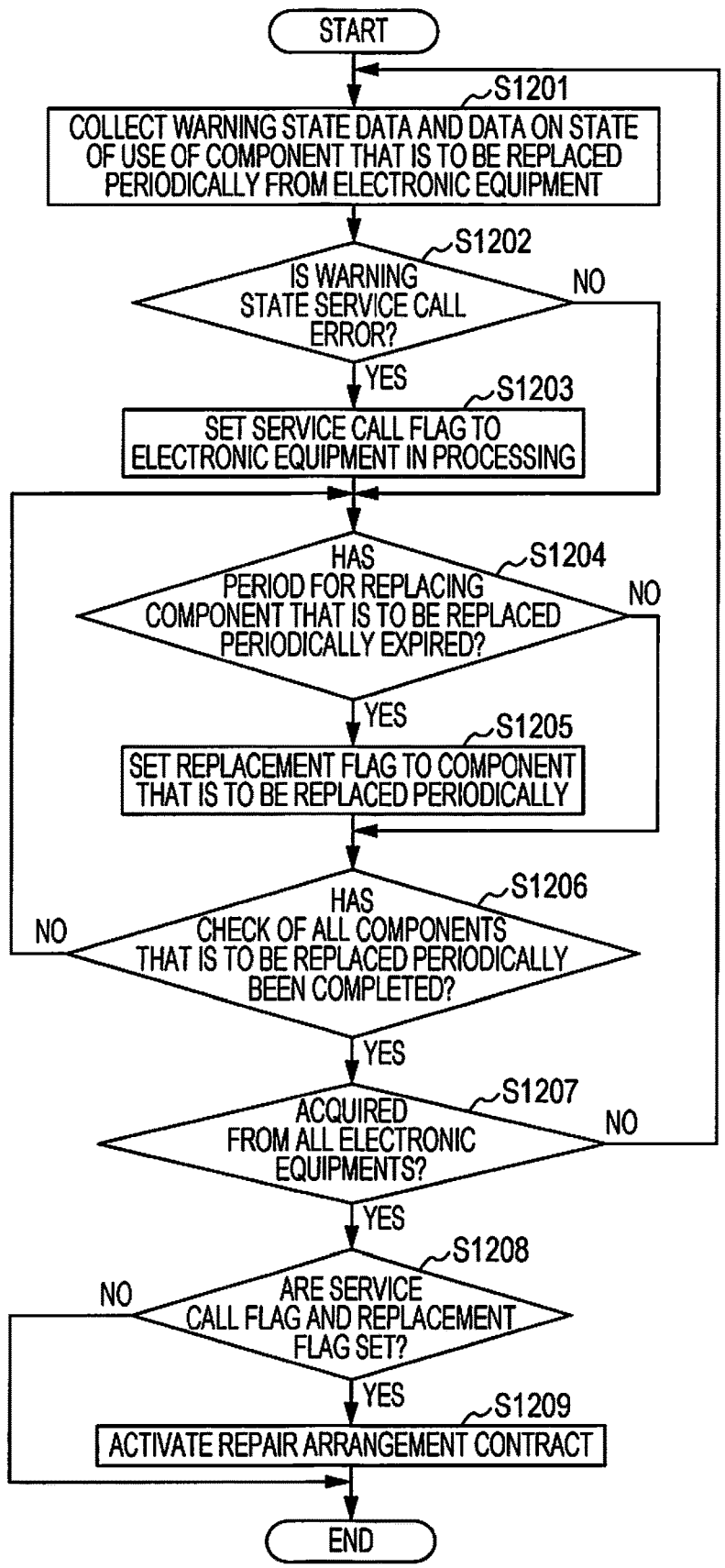
FIG. 17 is a flowchart for describing state verification processing.

FIG. 17 is a flowchart for describing processing by the state verification contract. The state verification contract is activated in S1003 in FIG. 15 or in S1102 in FIG. 16. The processing apparatus 200 that makes the state verification contract acquires the information that specifies the electronic equipment 300 which is a collection target, from the agreement management contract. Then, the processing apparatus 200 collects the data on the state, which includes data indicating whether or not the state where a repair is necessary is attained, and the data on the status of the use, which includes information that is the number of times that a component that is to be replaced periodically is used, or information that is a time for which the component that is to be replaced periodically is used, from the electronic equipment 300 that is a target (S1201). Based on the collected data on the state, the processing apparatus 200 determines whether or not the electronic equipment 300 is in the error state where the service call is necessary (S1202). When Yes is a result of the determination in S1202, a service call flag is set for the electronic equipment 300 that is a target (S1203). When No is a result of the determination in S1202, the processing in S1203 is omitted.

Furthermore, based on the collected data on the status of the use, the processing apparatus 200 determines whether or not a period for replacing the component that is to be replaced periodically expires (S1204). For example, processing that compares the number of times acquired as the data on the status of the use, and the number of times of durability that is set in advance for every component determines whether or not a period of replacement expires. Alternatively, a comparison may be made between the number of years for which a component is in use and the number of years for which a component is durable. When Yes is a result of the determination in S1204, a replacement flag relating to a target component that is to be replaced periodically is set (S1205). When No is a result of the determination in S1204, the processing in S1205 is omitted. The processing apparatus 200 determines whether or not verification processing on all components that are to be replaced periodically is ended (S1206). When the replacement verification processing is not ended, returning to S1204 takes place, and the processing is repeated.

The processing apparatus 200 determines whether or not processing on all pieces of electronic equipment 300 is completed (S1207). When No is a result of the determination in S1207, returning to S1201 takes place and the processing is continued. When Yes is a result of the determination in S1207, the processing apparatus 200 determines whether or not the service call flag or the replacement flag is set for any electronic equipment 300 (S1208). When at least one flag is set (Yes in S1208), the processing apparatus 200 activates the repair arrangement contract (S1209). When No is a result of the determination in S1208, the processing is ended without activating the repair arrangement contract.

Figure 18:
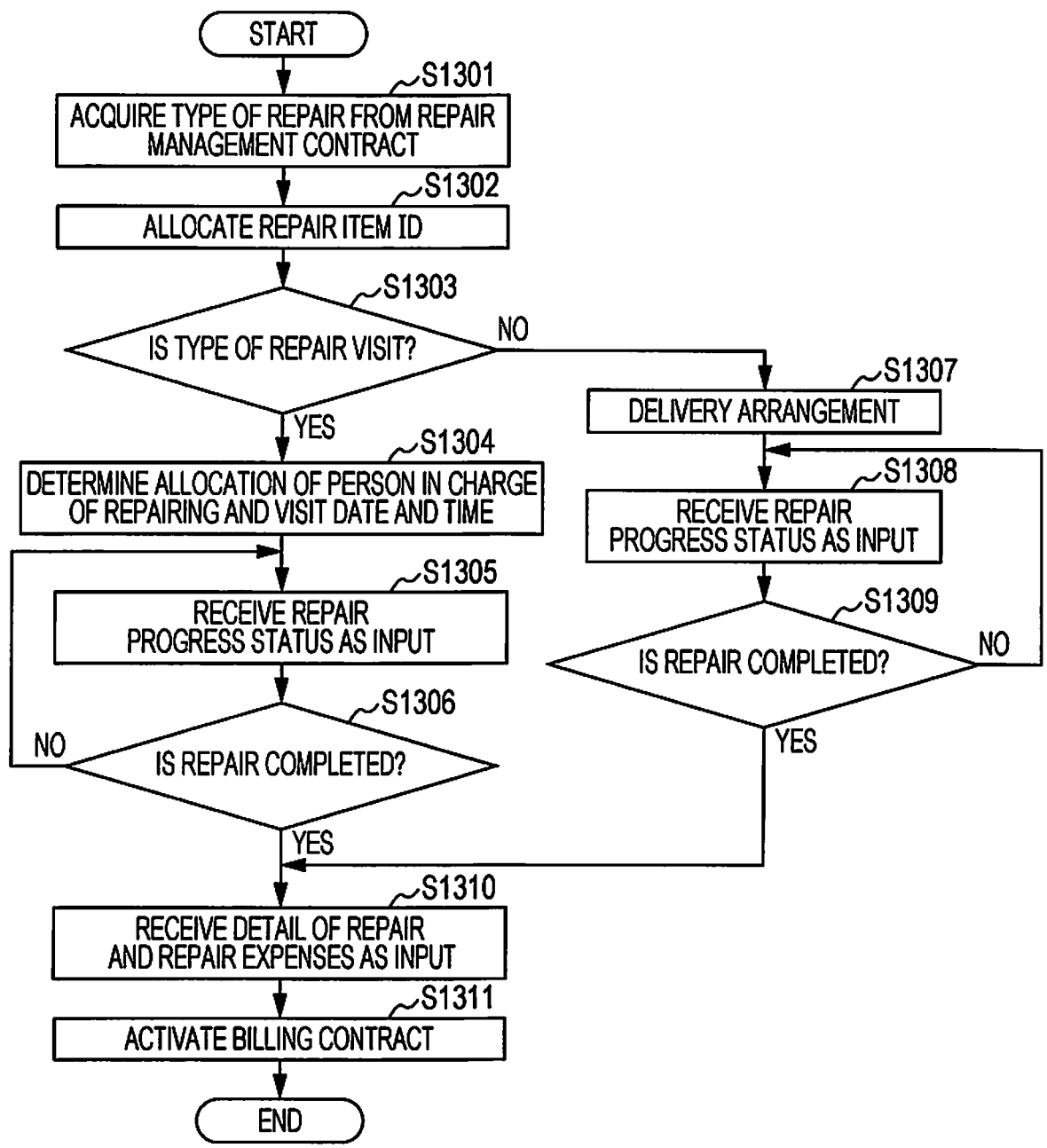
FIG. 18 is a flowchart for describing repair arrangement processing.

FIG. 18 is a flowchart for describing processing by the repair arrangement contract. The repair arrangement contract is activated in S1209 in FIG. 17. The providing apparatus 100 that makes the repair arrangement contract inquires of the agreement management contract based on the agreement ID that is received when the repair arrangement contract is activated and acquires the type of repair (S1301). The providing apparatus 100 allocates a unique repair item ID to every repair item (S1302).

The providing apparatus 100 determines whether or not the type of repair is the repair that requires a service visit (S1303). When the type of repair is the repair that requires a service visit (Yes in S1303), the providing apparatus 100 determines the allocation of a person in charge of repairing and a date and time for repairing (S1304). The date and time for repairing may be determined on the system side. As the date and time for repairing, a date and time that is determined by the person in charge of repairing may be input. Thereafter, the person in charge of repairing performs the repair that requires a service visit, and the repair progress status is input for the repair item ID to which the repair arrangement contract corresponds. The providing apparatus 100 receives the repair progress status, as an input (S1305) and determines whether or not the repair is completed (S1306). When the repair is not completed (No in S1306), returning to S1305 and the processing is continued until the repair is completed.

When the repair is the repair that requires taking-back (No in S1303), the providing apparatus 100 performs processing that arranges a delivery of the electronic equipment 300 that is a target to take back (S1307). The receiving of the repair progress status as an input (S1308) and the determination of whether or not the repair is completed (S1309) are the same as in the repair that requires a service visit.

When it is determined that the repair is completed (Yes in S1306 or S1309), the providing apparatus 100 receives the detail of the repair and the repair expenses as inputs (S1310). The providing apparatus 100 sets the agreement ID, the repair item ID, the information that specifies the electronic equipment 300, and the repair expense as parameters, and activates the billing contract (S1311). It is noted that in the processing in FIG. 18, when the determination of the repair item ID or any inputting is performed, the corresponding information is written into the blockchain each time.

Figure 19:
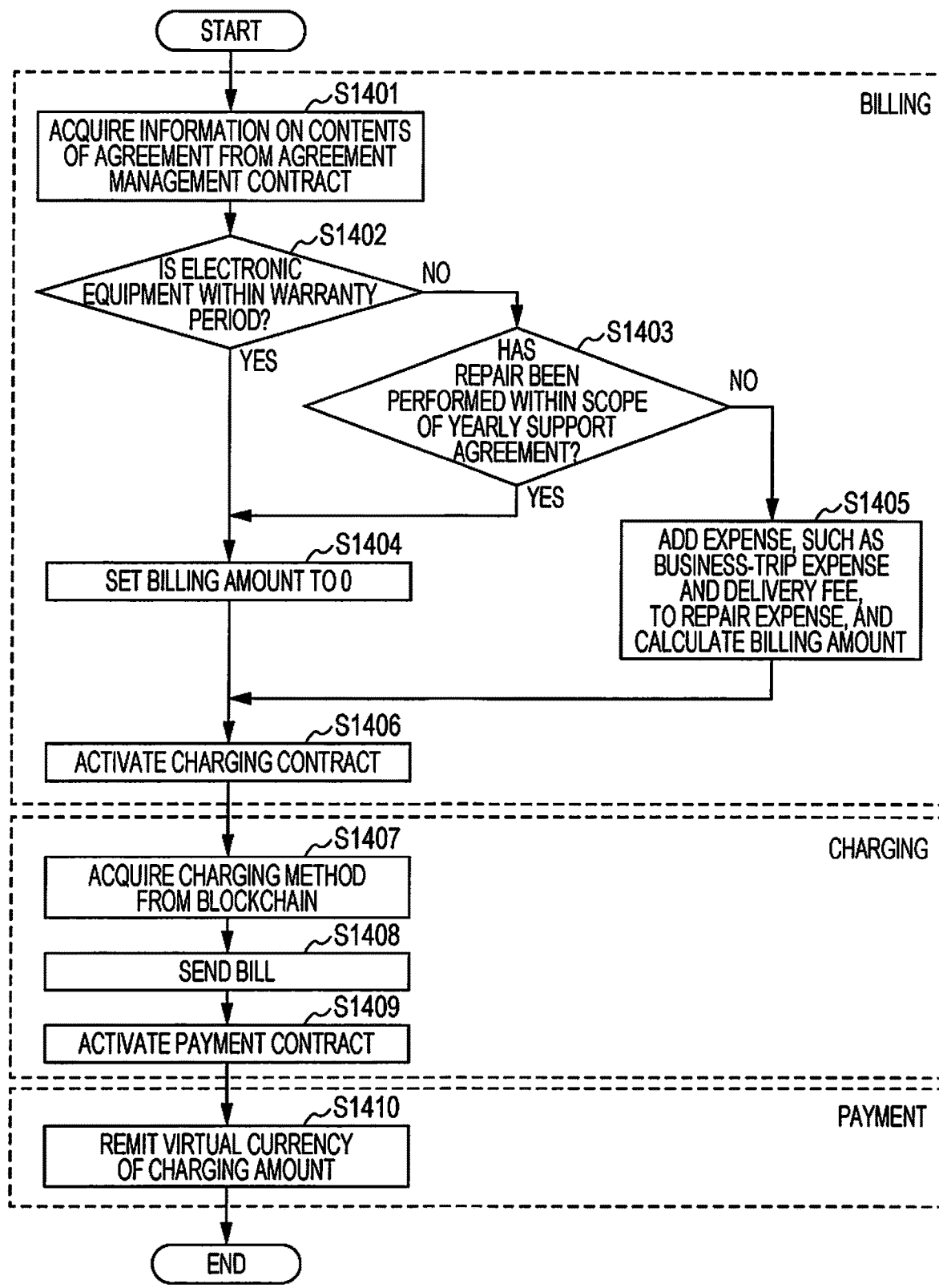
FIG. 19 is a flowchart for describing the billing processing, the charging processing, and the payment processing.

FIG. 19 is a flowchart for describing processing by each of the billing contract, the charging contract, and the payment contract. In S1311 in FIG. 18, the billing contract is activated by the repair arrangement contract. The providing apparatus 100 that makes the billing contract inquires of the agreement management contract based on the agreement ID that is received when the billing contract is activated, and thus acquires the information on the contents of the agreement, which includes the warranty period and the yearly support agreement (S1401).

The providing apparatus 100 determines whether or not the warranty period of the electronic equipment 300 that is a repair target does not expire (S1402). Furthermore, the providing apparatus 100 determines whether or not the repair is performed within a scope of the yearly support agreement (S1403). When Yes is a result of the determination in any one of S1402 and S1403, the providing apparatus 100 sets the billing amount to 0 (S1404). When No is a result of the determination in both S1402 and S1403, the providing apparatus 100 adds expenses, such as a business-trip expense and a delivery fee, to the repair expense that is received when the activation is performed (S1405). It is noted that it is considered that No is a result of the determination in S1403 when the yearly support agreement is an agreement that is not made, when the agreement is made but a detail of a repair is not within the yearly support agreement, and so on.

When the billing amount is determined, the providing apparatus 100 sets the agreement ID and the billing amount as parameters and activates the charging contract (S1406).

The providing apparatus 100 that makes the charging contract inquires of the agreement management contract based on the agreement ID that is acquired as a parameter, and acquires a destination as a charging method or information on a sending method (S1407). The providing apparatus 100 sends a bill using the acquired method (S1408). In order to make a request for payment, the charging contract sets an address for receiving of its own virtual currency and a charging amount as parameters and activates the payment contract of the party to the agreement that is a target to be charged (S1409).

The providing apparatus 100 that makes the payment contract sets an address of the party to the agreement, which is retained by the providing apparatus 100 itself, as an address for transmitting the virtual currency. Then, the providing apparatus 100 performs processing that writes trading data, which indicates that the corresponding charging amount is remitted from the transmission address to a reception address acquired as a parameter, into the blockchain (S1410). Actual trading of the virtual currency takes place after the building of a consensus, which is based on the consensus algorithm, is approved.

Thereafter, the processing that is illustrated in each of FIGS. 15 to 19 is also performed, and thus, the processing system 10 that automatically performs the repair contracting service can be realized.

5. Modification Examples

Several modification examples will be described below.

5.1 Other Services

As specific examples of the service, the consumable-item delivery service and the repair contracting service are described above. However, the service relating to the electronic equipment 300 is not limited to this, and various modification implementations are possible.

Examples of the modification implementation are considered to include an installation service that performs processing such as installation or wiring of the electronic equipment 300, a setting service that sets up the electronic equipment 300, a binding order reception service that performs processing which binds printed matters, a high-definition printing order reception that performs high-definition printing such as photo printing, and the like. If information indispensable for service registration, and the like are registered, it is also possible that the service provider provides any service of the services described above. Furthermore, the service conducts a search for, and makes a selection of, a service using the directory service, and thus possibly utilizes various services. Then, because these procedures are automated using the blockchain, it is possible that a platform which is easy for the service provider and the service user to use is realized.

5.2 Modification Examples of Agreement Management Program

The example where the agreement management contract has a function that is performed periodically and the example where the agreement management contract that does not have a function that is performed periodically is activated by an external program are described above. In either of the examples, the agreement management program is described as being realized as a program that is written into the blockchain using the smart contract.

However, the agreement management program itself may be set as an external program. The external program is activated at a timing at which a different contract such as the collection contract is necessary.

In the consumable-item delivery service, the processing unit 110 of the providing apparatus 100 may generate a transaction for registering with the blockchain the remaining quantity collection program that collects the data on the status of the use of the consumable item for the electronic equipment 300, and the remaining quantity collection program may be activated by an external program. Alternatively, the processing unit 110 may generate a transaction for registering with the blockchain the warning state verification program that verifies whether or not the electronic equipment 300 is in the warning state that is based on a shortage of a consumable item, and the warning state verification program may be activated by an external program. Furthermore, in the repair contracting service, a transaction for registering with the blockchain the state verification program that performs at least one of the processing that verifies the error state of the electronic equipment 300 and the processing that determines whether the component of the electronic equipment 300 is replaced may be generated, and the state verification program may be activated by an external program. When this is done, it is possible that the agreement management program is realized in many ways.

5.3 Determination of Whether or not Legitimate Service is Present

A digital ID is allocated to the service provider. This may be a digital ID that is issued by the third-party organization and may be a digital ID that is allocated in the service providing platform. When the service is utilized that utilizes the smart contract, the digital ID may be used to verify whether or not the service is registered completely as a legitimate service.

For example, when the processing program for providing a service is invoked, the agreement management contract determines whether or not the service is a legitimate service using the digital ID. Examples of the processing program that provides a service include the remaining quantity collection contract and the warning state verification contract in the consumable-item delivery service, the state verification contract in the repair contracting service, and the like.

When the digital ID is an ID that is issued by the third-party organization, the agreement management contract inquires of the third-party organization when a service is utilized, and verifies whether or not the ID is an ID that is acquired legitimately. Alternatively, when the digital ID is an ID that is allocated by a management system of the service-providing platform, the agreement management contract inquires of the management system when a service is utilized and verifies whether or not the ID is an ID that is allocated legitimately.

It is noted that when an initial inquiry is made, a token that is approved completely is acquired, that the token is re-utilized within a validated period of the token, and thus that the re-utilized token may be verified as a legitimately-acquired ID.

As described above, the providing apparatus 100 according to the present embodiment includes a communication unit that performs communication with a network which uses the blockchain and a processing unit that controls the communication unit. The processing unit generates a transaction for registering with the blockchain the service providing processing program for performing the service providing processing on the electronic equipment that is a management target, and issues the generated transaction to a network through the communication unit. The service providing processing program performs processing that makes a request to the service provider, which is indicated by the information on the service provider stored in the blockchain, for a service.

When this is done, it is possible that the service providing processing program is executed on each node on the network that uses the blockchain. Accordingly, it is possible that a service that uses the blockchain is provided properly. On that occasion, it is possible that the information on the service provider for specifying which service provider performs a service is also managed on the blockchain.

Furthermore, the processing unit according to the present embodiment may generate a transaction for registering with the blockchain the agreement management program that manages the information on the contents of the agreement for determining the detail of the service providing processing, and the information on the service provider.

When this is done, it is possible that a specific detail of a service and the service provider that provides the service are managed in a properly associated manner.

Furthermore, the service providing processing program according to the present embodiment may include the state verification program that performs at least one of the processing that verifies the error state of the electronic equipment and the processing that determines whether or not the component of the electronic equipment is replaced. The processing unit of the providing apparatus generates a transaction for registering the state verification program with the blockchain.

When this is done, it is possible that, using the blockchain, it is verified whether or not the repair of the electronic is necessary.

Furthermore, the service providing processing program according to the present embodiment may include the state verification program that performs at least one of the processing that verifies the error state of the electronic equipment and the processing that determines whether the component of the electronic equipment is replaced, the state verification program being activated, according to a given schedule, by the agreement management program. The processing unit of the providing apparatus generates a transaction for registering the state verification program with the blockchain.

When this is done, it is possible that, using the blockchain, it is verified whether or not the repair of the electronic is necessary. Furthermore, it is possible that a timing at which a state is verified is managed by the agreement management program.

Furthermore, the service providing processing program according to the present embodiment may include the repair arrangement processing program for performing processing that arranges the repair of the electronic equipment, which is activated by the state verification program. The processing unit of the providing apparatus generates a transaction for registering the repair arrangement processing program with the blockchain.

When this is done, it is possible that the repair that is based on a result of the verification of the state is arranged using the blockchain.

Furthermore, the service providing processing program according to the present embodiment performs the processing that writes service-providing data, which includes an expense that occurs by providing a service, into the blockchain. Based on the service-providing data written into the blockchain, the processing unit of the providing apparatus generates a transaction for registering with the blockchain the billing processing program that determines a billing amount.

When this is done, it is possible that processing which charges the expense that occurs by providing a service is performed using the blockchain.

Furthermore, the processing unit according to the present embodiment generates a transaction for registering with the blockchain the charging program for charging a corresponding agreement account the billing amount determined by the billing processing program. Then, the charging program is activated by the billing processing program.

When this is done, it is possible that the billing amount is charged using the blockchain and that the billing processing program and the charging program run in cooperation with each other.

Furthermore, the processing unit according to the present embodiment may generate a transaction for registering the service providing processing program with the blockchain using the smart contract.

When this is done, it is possible that the service providing processing program is provided, using the smart contract in the blockchain technology.

Furthermore, the processing unit according to the present embodiment may generate a first transaction for registering with the blockchain the management program for managing the service provider that provides the service relating to the electronic equipment, and may issue the generated first transaction to a network through the communication unit. The management program generates a second transaction for registering with the blockchain the information that results from associating the information on the service provider, which identifies the service provider with the service providing processing program for providing a service by the service provider, and issues the generated second transaction to a network through the communication unit.

When this is done, the management program for managing the service provider and information that is managed by the management program is written into the blockchain. Because processing that registers information for providing a service is possible, the service providing platform that uses the blockchain can be established properly.

Furthermore, the processing system according to the present embodiment includes any providing apparatus described above and the processing apparatus that is provided in a manner that corresponds to the electronic equipment and that acquires the service providing processing program from the blockchain and performs the service providing processing program.

When this is done, the system for providing a service using the blockchain can be realized.

Furthermore, the processing system according to the present embodiment may include the providing apparatus described above and the processing apparatus is provided in a manner that corresponds to the electronic equipment, and the processing apparatus may generate a transaction for registering with the blockchain the payment program that makes a payment in response to the charging by the charging program. The payment program makes a payment using the virtual currency in the blockchain.

When this is done, it is possible that the payment processing in response to the charging is performed using the blockchain. On that occasion, the processing apparatus on the side that is charged performs processing that registers the payment program, and thus it is possible that processing which remits the virtual currency is performed properly.

It is noted that the present embodiment is described in detail above, but that a person of ordinary skill in the art can easily understand that many modifications are possible which do not substantially depart from new matters or effects according to the present disclosure. Therefore, such modification examples are all included within the scope of the present disclosure. For example, the term that is described at least one time together with a different term that has a broader meaning or the same meaning, in the specification or the drawings, can be replaced with such a different term, throughout the specification or the drawings. Furthermore, all combinations of the present embodiment and the modification examples are also included in the scope of the present disclosure. Furthermore, configurations, operations, and the like of the providing apparatus, the processing apparatus and the processing system are not limited to those which are described in the present embodiment, and various modification implementations are possible.

What is claimed is:

1. A providing apparatus comprising:
a communication unit that performs communication with a network that uses a blockchain; and
a processing unit that controls the communication unit, wherein
the processing unit
generates a first transaction including a management program that manages a service provider that provides a service relating to an electronic equipment that is an object of management, and
issues the first transaction to the network through the communication unit, and
the management program is registered with the blockchain based on the first transaction,
the management program generates a second transaction including information that associates information that identifies the service provider with a service providing processing program for providing the service by the service provider, the information includes a digital ID which is identification information that is issued and allocated to the service provider by a third-party different from the providing apparatus, or by a management system used by the providing apparatus, and the management program issues the second transaction to the network through the communication unit, and
the information is registered with the blockchain based on the second transaction,
the processing unit further
generates a third transaction including the service providing processing program that causes a processing apparatus to perform service providing processing for the electronic equipment, the processing apparatus is connected to the electronic equipment, and
issues the third transaction to the network through the communication unit, the service providing processing program is registered with the blockchain based on the third transaction, the processing apparatus acquires the service providing processing program from the blockchain, and the service providing processing program causes the processing apparatus to perform processing that makes a request to the service provider, which is indicated by the information on the service provider, for a service.

\* \* \* \* \*